United States Patent
Sakamoto et al.

(10) Patent No.: US 6,536,296 B2
(45) Date of Patent: Mar. 25, 2003

(54) APPARATUS AND METHOD OF CONTROLLING A VEHICLE

(75) Inventors: Hiroshi Sakamoto, Hitachi (JP); Toshimichi Minowa, Mito (JP); Takashi Okada, Hitachi (JP); Mitsuo Kayano, Hitachi (JP); Tatsuya Ochi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/098,596

(22) Filed: Mar. 18, 2002

(65) Prior Publication Data

US 2002/0132700 A1 Sep. 19, 2002

Related U.S. Application Data

(63) Continuation of application No. 09/792,031, filed on Feb. 26, 2001.

(30) Foreign Application Priority Data

Jun. 23, 2000 (JP) ........................... 2000-194874

(51) Int. Cl.⁷ .................. F16H 3/08; B60K 41/02
(52) U.S. Cl. ................ 74/325; 74/337; 477/6; 477/7; 477/181; 701/53
(58) Field of Search .................. 74/325, 745, 331, 74/333, 337, 339; 477/5, 6, 175, 181, 79, 86, 77; 180/65.2, 65.3; 701/22, 53, 67

(56) References Cited

U.S. PATENT DOCUMENTS

| | | | |
|---|---|---|---|
| 4,544,057 A | 10/1985 | Webster | 192/76 |
| 4,627,312 A | 12/1986 | Fujieda | 74/866 |
| 4,860,607 A | 8/1989 | Numazawa | 74/330 |
| 5,313,856 A | 5/1994 | Schneider | 477/80 |
| 5,724,866 A * | 3/1998 | Minowa et al. | 74/664 |
| 5,938,712 A * | 8/1999 | Ibamoto et al. | 701/54 |
| 6,095,001 A | 8/2000 | Ruehle | 74/331 |
| 6,328,670 B1 * | 12/2001 | Minowa et al. | 477/5 |
| 6,341,541 B1 * | 1/2002 | Sakamoto et al. | 74/665 A |

FOREIGN PATENT DOCUMENTS

| | | | | |
|---|---|---|---|---|
| EP | 367020 | * | 5/1990 | 74/335 |
| EP | 1127731 | * | 8/2001 | B60K/41/04 |
| EP | 1164310 | * | 12/2001 | F16H/3/083 |
| JP | 60-172759 | | 9/1985 | |
| JP | 61-45163 | | 3/1986 | |
| JP | 2000-065199 | | 3/2000 | |

OTHER PUBLICATIONS

Japanese office action with English translation.

* cited by examiner

*Primary Examiner*—Sherry Estremsky
*Assistant Examiner*—Tisha D. Lewis
(74) *Attorney, Agent, or Firm*—Crowell & Moring LLP

(57) ABSTRACT

An apparatus and a method of controlling a vehicle is provided for correcting a lowered value of the torque of an output shaft in the gear shifting and suppressing a revolution speed of an input shaft on the basis of the lowered torque correction. The torque of the input shaft is adjusted at the termination of the gear shifting on the basis of the lowered torque correction.

40 Claims, 23 Drawing Sheets

TORQUE TRANSMISSION PATH -----▶

TORQUE TRANSMISSION PATH -----▶

TORQUE TRANSMISSION PATH – – – ▶

ENGINE TORQUE TRANSMISSION PATH ------>
MOTOR TORQUE TRANSMISSION PATH ———>

TORQUE TRANSMISSION PATH — — — ▶

TORQUE TRANSMISSION PATH ----▶

TORQUE TRANSMISSION PATH ----▶

ENGINE TORQUE TRANSMISSION PATH -------▶
MOTOR TORQUE TRANSMISSION PATH ─────▶

APPARATUS AND METHOD OF CONTROLLING A VEHICLE

CROSS-REFERENCE TO RELATED APPLICATIONS

This application is a continuation of application Ser. No. 09/792,031, filed Feb. 26, 2001.

The present application relates to subject matters described in application which will be filed on Feb. 28, 2001 by N. Ozaki, T. Matsumura, T. Minowa, T. Okada and T. Ochi and entitled "AUTOMATIC TRANSMISSION CONTROL METHOD AND AUTOMATIC TRANSMISSION CONTROLLER" and assigned to the assignee of the present application, and to application which will be filed on Feb. 28, 2001 by T. Matumura, H. Sakamoto, M. Kayano and T. Ochi and entitled "CONTROL METHOD AND SYSTEM FOR VEHICLE" and assigned to the assignee of the present application. The disclosure of these applications are incorporated herein by reference.

BACKGROUND OF THE INVENTION

The present invention relates to an apparatus and a method of controlling a vehicle.

As a vehicle provided a gear drive transmission mechanism, this type of vehicle has been conventionally known which utilizes a friction clutch as the smallest gear ratio of the gear drive transmission, controls the revolution speed of an input shaft of the transmission to be in synchronous to the revolution speed of an output shaft by slipping this friction clutch when shifting the gear, and corrects the torque lowered in shifting the gear by means of the torque transmitted by the friction torque for the purpose of realizing smoother gear shifting. The representative one of this type of vehicle is disclosed in JP-A-61-45163.

In shifting the gear, however, if the revolution speed is controlled only through the use of the friction clutch, the torque of the output shaft corrected by the friction clutch is made so variable that a passenger in a vehicle may disadvantageously feel uncomfortable with the vehicle.

Further, when terminating the gear shifting, if the correction for the lowered torque in gear shifting, corrected by the friction clutch, is not matched to the torque of the input shaft transmitted to the output shaft through a dog clutch, disadvantageously again, the torque may be abruptly changed.

SUMMARY OF THE INVENTION

It is an object of the present invention to provide an apparatus and a method of controlling a vehicle which are constructed to suppress the variation of the torque of the output shaft of the transmission caused by the control of the rotation speed in gear shifting and to reduce the abrupt change of the torque caused in terminating the gear shifting, for improving the performance in gear shifting.

In the gear shifting, the dog clutch may be engaged by matching the revolution speeds. The adverse effect by a control error and a variety of an oil pressure brings about inertia torque caused by the deviation of the revolution speed (ratio) in engaging the dog clutch, which inertia torque may lead to a vibrating torque variation (shaft vibration). It is a further object of the present invention to alleviate the inertia torque and thereby suppressing the torque variation, for improving the performance in gear shifting of a vehicle.

The present invention concerns with an apparatus of controlling a vehicle which provides torque transmission devices between an input shaft and an output shaft of a gear drive transmission, uses a friction clutch for the torque transmission device of at least one gear ratio position and a dog clutch for the torque transmission device of another gear ratio position, and control the friction clutch when shifting one gear ratio position to another position. This apparatus includes a lowered torque correcting unit for correcting the lowered torque of the output shaft in shifting the gear and a revolution speed control unit for controlling a revolution speed of the input shaft on the basis of the corrected value of the lowered torque given by the lowered torque correcting unit.

More preferably, the apparatus of controlling a vehicle includes a torque adjusting unit for adjusting the torque of the input shaft when terminating the gear shifting on the basis of the corrected value of the lowered torque.

Further, the present invention concerns with a method of controlling a vehicle which is arranged to provide a torque transmission device between an input shaft and an output shaft of a gear drive transmission, use a friction clutch for the torque transmission device of at least one gear ratio position and a dog clutch for the torque transmission device of another gear ratio position, and control the friction clutch in shifting one gear ratio position to another gear ratio position. This control method includes the steps of correcting the lowered torque of the output shaft in gear shifting and controlling the revolution speed of the input shaft on the corrected value of the lowered torque.

More preferably, the method of controlling a vehicle according to the invention is arranged to adjust the torque of the input shaft when terminating the gear shifting on the basis of the torque corrected value.

Further, the invention concerns with an apparatus of controlling a vehicle which is constructed to separate a torque transmission system located between the input shaft and the output shaft of the gear drive transmission into a first transmission system and a second transmission system, each of which is composed of a combination of dog clutches, use the friction clutches for the torque transmission systems located between an engine and the first transmission system and between the engine and the second transmission system, and control the friction clutches in shifting one gear ratio position to another. The control apparatus includes a lowered torque correcting unit for correcting the lowered torque of the output shaft in gear shifting and a revolution speed control unit for controlling the revolution speed of the input shaft on the basis of the corrected value of the lowered torque given by the lowered torque correcting unit.

More preferable, the apparatus of controlling a vehicle according to the invention includes a torque adjusting unit for adjusting the torque of the input shaft in terminating the gear shifting on the basis of the corrected value of the lowered torque.

Further, the present invention concerns with a method of controlling a vehicle in which a torque transmitting system located between an input shaft and an output shaft of a gear drive transmission is separated into a first transmission system and a second transmission system, each of which is a combination of dog clutches, the torque transmitting systems located between an engine and the first transmission system and between the engine and the second transmission system are friction clutches, and the friction clutches are controlled when one gear stage is changed into another gear stage, the method including the step of correcting the lowered torque value of the output shaft in the gear shifting during the shifting, and the step of controlling a revolution speed of said input shaft on the basis of the corrected lowered torque correction.

More preferably, the method of controlling a vehicle according to the invention is arranged to adjust the torque of the input shaft when terminating the gear shifting on the basis of the torque corrected value.

Further, the invention concerns with an apparatus of controlling a vehicle wherein devices for transmitting torque are located between an input shaft and an output shaft of a gear drive transmission, the torque transmitting device of at least one gear stage is a friction clutch, said torque transmitting device of another gear stage is a dog clutch, and the friction clutch is controlled when one gear stage is changed into another gear stage, said apparatus including a unit for suppressing torque variation of said output shaft taking place when the dog clutch is engaged by means of at least one friction clutch provided in the gear drive transmission in the case of the gear shifting.

Further, the present invention concerns with an apparatus of controlling a vehicle which is constructed to provide a torque transmission device between an input shaft and an output shaft of a gear drive transmission, use a friction clutch for the torque transmission device of at least one gear ratio position and a dog clutch for the torque transmission device of another gear ratio position, and control the friction clutch in shifting one gear ratio position to another. The control apparatus includes a torque variation suppressing unit for suppressing the torque variation of the output shaft generated in engaging the dog clutches through the effect of at least one friction clutch located in the gear drive transmission.

Moreover, the present invention concerns with a method of controlling a vehicle which is constructed to locate a torque transmission device between an input shaft and an output shaft of a gear drive transmission, use a friction clutch for the torque transmission device of at least one gear ratio position and a dog clutch for the torque transmission device of another gear ratio position, and control the friction clutch in shifting one gear ratio position to another. The control method includes the step of suppressing a torque variation of the output shaft generated in engaging the dog clutch in gear shifting by means of at least one dynamo-electric machine located in the gear drive transmission.

Further, the present invention concerns with an apparatus of controlling a vehicle which is constructed to locate a torque transmission device between an input shaft and an output shaft of a gear drive transmission, use a friction clutch for at least one gear ratio position and a dog clutch for the torque transmission of another gear ratio position and control the friction clutch in shifting one gear ratio position to another. The control apparatus includes the step of suppressing the torque variation of the output shaft generated in engaging the dog clutch through the effect of at least one dynamo-electric machine located in the gear drive transmission.

DESCRIPTION OF THE EMBODIMENTS

The embodiments of the present invention will be described with reference to the appended drawings.

Figure 1:
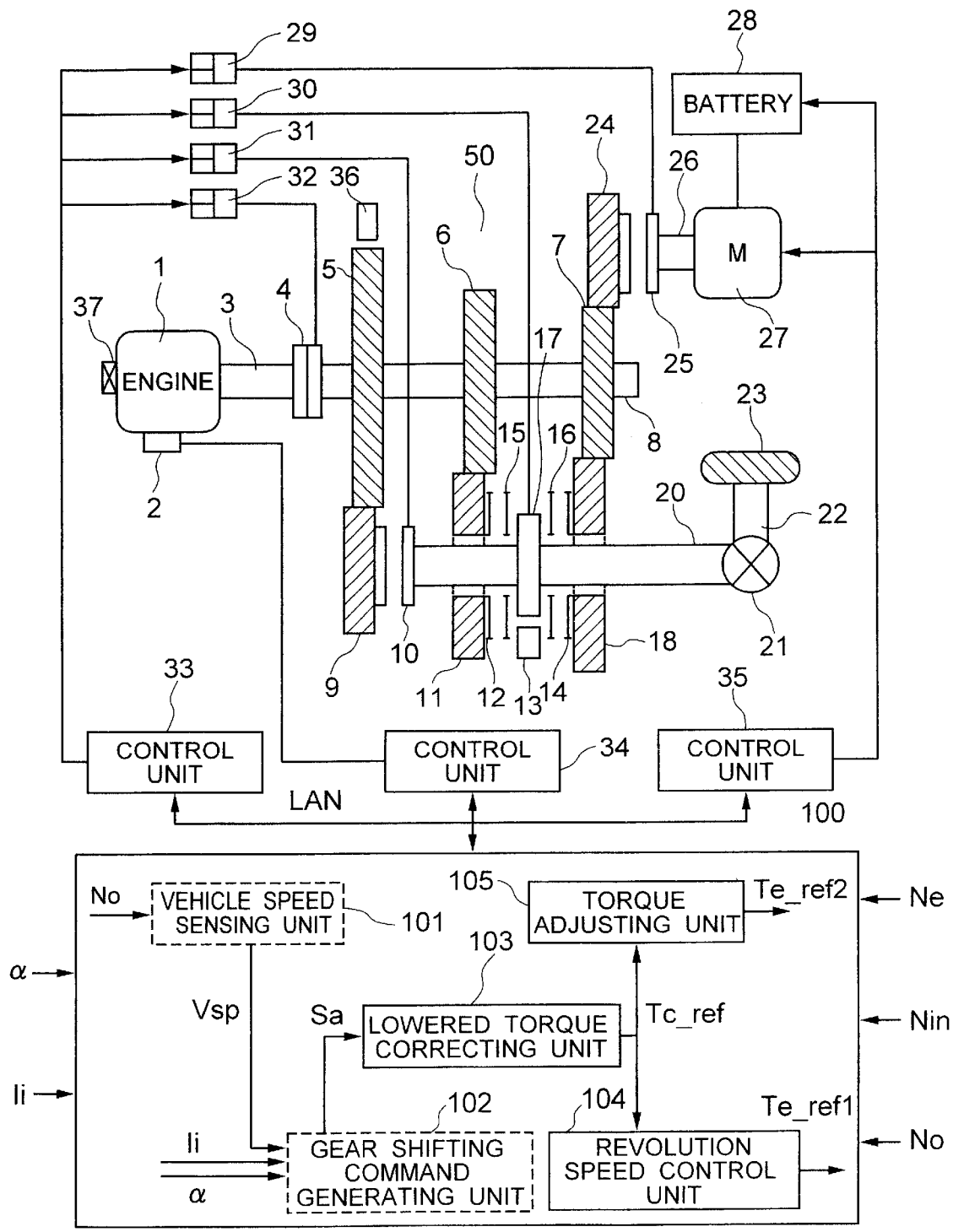
FIG. 1 is a block diagram showing a vehicle system and a control apparatus thereof according to an embodiment of the present invention.

FIG. 1 is a block diagram showing a vehicle system and a control apparatus thereof according to an embodiment of the present invention.

An engine 1 provides an electronic control throttle 2 for adjusting engine torque and a rotary sensor 37 for measuring a revolution speed Ne of the engine 1 (also referred to as an engine speed Ne), through which the output torque can be controlled with high accuracy.

A clutch 4 is located between an output shaft 3 of the engine 1 and an input shaft 8 of a gear drive transmission 50 so that the output torque of the engine 1 may be transmitted to the input shaft 8 of the gear transmission. The clutch 4 is a dry type single plate one in which its pressure force is controlled by a hydraulic actuator 32. By adjusting the pressure force of the clutch 4, the power transmission from the output shaft 3 to the input shaft 8 of the engine is connected or disconnected.

The input shaft 8 includes gears 5, 6, 7 fixed thereto. The gear 5 is used as a sensor for a revolution speed Nin of the input shaft 8. The movement of the teeth of this gear 5 is sensed by the sensor 36 so that the revolution speed Nin of the input shaft 8 may be sensed accordingly.

The output shaft 26 of a motor 27 is connected to a gear 24 provided with a clutch 25 so that the gear 24 may constantly engaged with the gear 7. The clutch 25 is a dry type single plate one by which the output torque of the motor 27 may be transmitted to the gear 24. The pressure force of this clutch 25 is controlled by the hydraulic actuator 29 and the power transmission from the output shaft 26 to the input shaft 8 may be connected or disconnected by adjusting the pressure force of the clutch 25.

The output shaft 20 of the gear drive transmission 50 includes a gear 18 provided with a toothed wheel 14 and a synchronizer ring 16, a gear 11 provided with a toothed wheel 12 and a synchronizer ring 15, and a hub 17 and a sleeve (not shown) for directly connecting between the gears 18 and 11 and the output shaft 20. The gears 18 and 11 provide a stopper (not shown) for stopping the movement of the gear in the axial direction of the output shaft 20, respectively. The inside of the hub 17 is provided grooves (not shown) for mating with a plurality of grooves (not shown) of the output shaft 20. This hub 17 is engaged with the output shaft 20 so that the hub 17 allows the gear to be relatively moved in the axial direction of the output shaft 20 but restricts the gear to be moved in the rotating direction. Hence, the torque of the hub 17 is transmitted to the output shaft 20.

In order to transmit the torque from the input shaft 8 to the hub 17, it is necessary to move the hub 17 and the sleeve in the axial direction of the output shaft 20 and directly couple the, toothed wheel 14 or 12 with the hub 17 through the synchronizer ring 16 or 15. The hub 17 and the sleeve are moved by the hydraulic actuator 30.

The hub 17 is used as a sensor for sensing a revolution speed No of the output shaft 20. The revolution speed of the output shaft 20 can be sensed by sensing the revolution of the hub 17 through the use of the sensor 13.

A torque transmitting device composed of the hub 17 and the sleeve, the toothed wheel 14, the synchronizer ring 16, the toothed wheel 12, and the synchronizer ring 15 takes a claw clutch mechanism, which is referred to as a dog clutch.

The mechanism allows the energy from a power source like the engine 1 to be highly efficiently transmitted to wheels 23 through a differential unit 21 and an axle 22, for aiding in reducing fuel consumption.

Further, the output shaft 20 has a gear 9 provided with a clutch 10. The clutch 10 uses a multiplate wet friction one as the torque transmitting device so that the torque of the input shaft 8 may be transmitted to the output shaft 20. The pressure force of this clutch 10 is controlled by the hydraulic actuator 23 and the power transmission from the input shaft 8 to the output shaft 20 may be connected or disconnected by adjusting this pressure force.

The gear ratio of the gear 5 to the gear 9 is adjusted to be smaller than the gear ratio of the gear 7 to the gear 18 or the gear ratio of the gear 6 to the gear 11.

In the engine 1, an electronic control throttle 2 provided in an intake pipe (not shown) is served to control an intake air flow so that a fuel amount matched to the intake air amount is injected from a fuel injection system (not shown). The throttle 2 is also served to determine an ignition timing on the basis of an air/fuel ratio determined by the air amount and the fuel amount and the engine speed Ne.

The fuel injection system may be an intake port injection system in which fuel is injected to an intake port or a cylinder injection system in which fuel is directly injected to the inside of the cylinder. It is preferable for the fuel injection system to reduce the fuel consumption and select a better exhaust performance by considering a operation range (determined by the engine torque and the engine speed) for the engine.

In turn, the description will be oriented to an apparatus 100 of controlling the engine 1, actuators 29, 30, 31 and 32, and a motor 27.

The control apparatus 100 is inputted with an accelerator pedal depress signal a, a shift lever position signal Ii, an engine speed signal Ne sensed by the sensor 37, an input shaft revolution speed signal Nin sensed by the sensor 36, and an output shaft revolution speed signal No. Then, this control apparatus 100 is served to compute the torque T3 of the engine 1 and then transmit the torque Te to a control device 34 through a LAN inside of a vehicle. The control device 34 is served to compute such a throttle valve opening angle, a fuel amount and an ignition timing as meeting the received engine torque Te and to control the actuators (for example, the electronic control throttle 2) based on these factors.

Further, the control apparatus 100 is served to compute the torque and the speed of the motor 27 and then transmit them to the control device 35 through the LAN. The control device 35 is served to charge a battery 28 with an electric power fed by the motor 27 and to feed an electric power from the battery 28 for driving the motor 27. The control apparatus 100 may be implemented by a computer including a CPU to be operated according to a program, a memory for storing a control program and data, an I/O control unit, and a bus for mutually connecting them with one another. Whole or a part of the control apparatus 10 can also be implemented by a hardware circuit.

The control apparatus 100 includes a vehicle speed sensing unit 101, a gear shifting command generating unit 102, a lowered torque correcting unit 103, a revolution speed control unit 104, and a torque adjusting unit 105.

The vehicle speed sensing unit 101 serves to compute a vehicle speed Vsp by means of a function f: Vsp=f(No) on the basis of the revolution speed No of the output shaft sensed by the sensor 13.

The gear shifting command generating unit 102 is served to determine a gear shifting command Ss on the basis of the inputted accelerator pedal depress amount α and the vehicle speed Vsp derived by the vehicle speed sensing unit 101. This gear shifting command Ss is selected from the values stored in a memory unit (not shown) included in the control apparatus 100, those values being derived as those for enhancing the efficiencies of the engine 1 and the motor 27 to a maximum by an experiment or simulation.

Herein, the description will be oriented to the control of the clutch 10 in changing the first gear driving state to the second gear driving state. The control of this clutch 10 is executed by controlling the actuators 29 to 32 in response to an indication from the control apparatus 100 so that the control device 33 may control the gear drive transmission 50.

Figure 2:
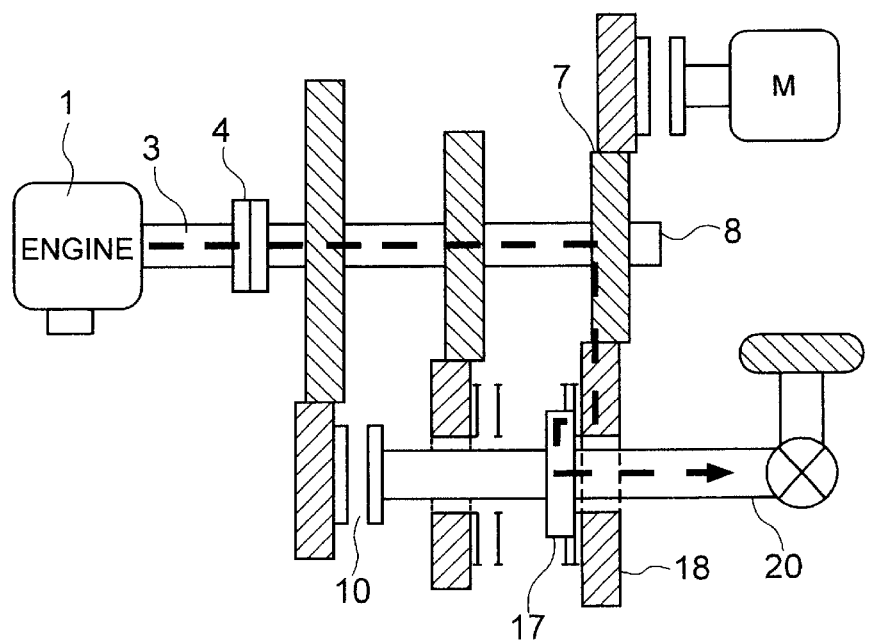
FIG. 2 is a view showing a transmission path of torque provided when a vehicle is driven by the driving force of an engine included in the embodiment shown in FIG. 1.

FIG. 2 is an explanatory view showing the first gear driving state provided in the case of accelerating the vehicle when it is run by the driving force of the engine 1. The dotted arrow of FIG. 2 indicates the transmission path of the torque. As an example, it is assumed that the clutch 4 is linked and the dog clutch (hub 17) is linked with the gear 18. In this state, the torque of the engine 1 is transmitted to the output shaft 20 through the clutch 4, the input shaft 8, the gear 7, and the gear 18. At this time, the clutch 10 is released.

Figure 3:
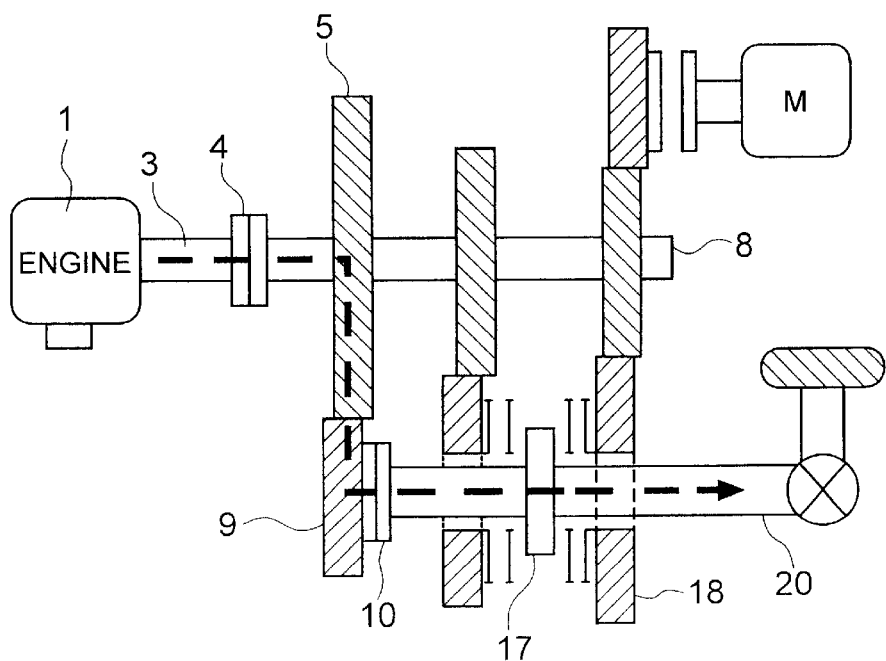
FIG. 3 is a view showing a transmission path of torque in gear shifting included in the embodiment shown in FIG. 1.

When the gear shifting command Ss is outputted by the gear shifting command generating unit 102, as shown in FIG. 3, the dog clutch (hub 17) is released and the gear 18 is unlinked from the output shaft 20. At a time, the actuator 31 is controlled so that the clutch 10 is pressed onto the gear and thereby the output torque of the engine 1 may be transmitted from the output shaft 3 to the output shaft 20 through the clutch 4, the input shaft 8, the gear 5, the gear 9, and the clutch 10. The torque of the engine 1 is transmitted to the axle 22 by means of the pressure force of the clutch 10 so as to produce the driving torque of the vehicle. By this, since the gear ratio is made smaller by using the gear 5 or 9, the load of the engine 1 is made larger and the engine speed is made lower accordingly. Hence, the gear ratio of the output shaft 20 to the input shaft 8 comes closer to the second gear ratio (smaller) rather than the first gear ratio.

Figure 4:
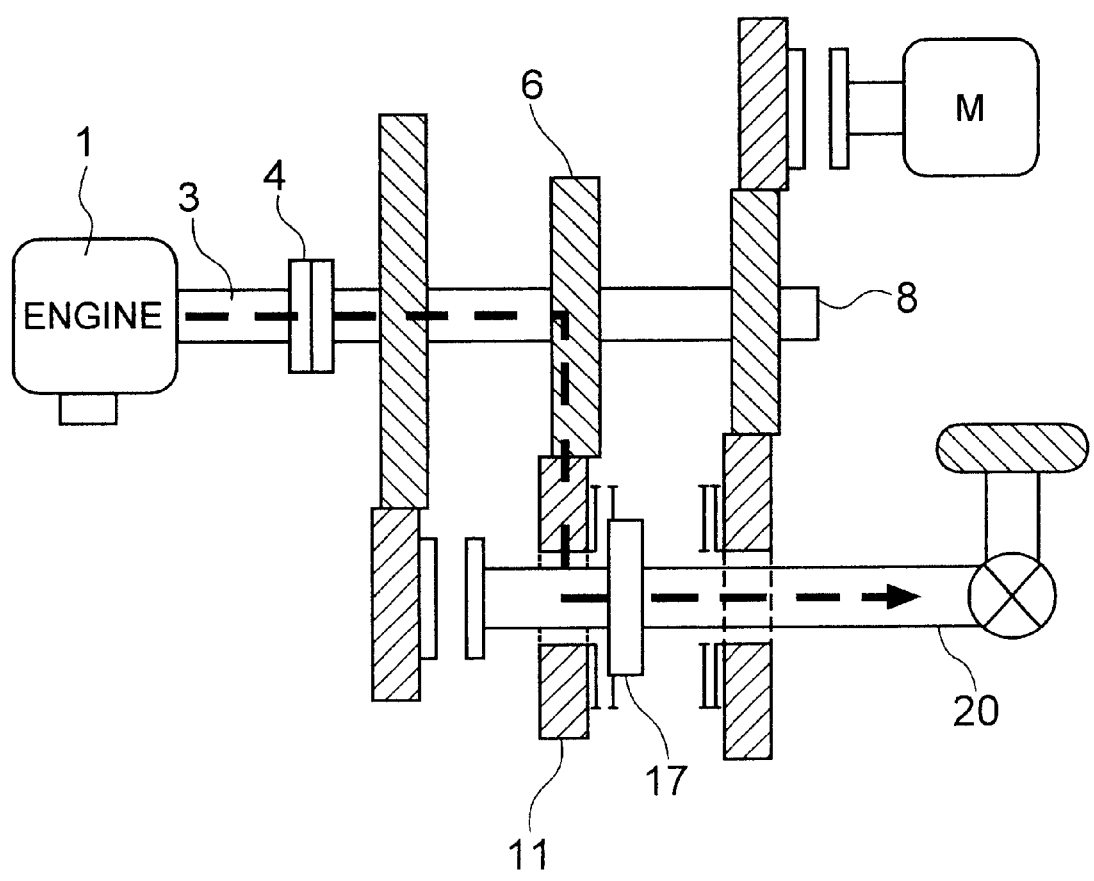
FIG. 4 is a view showing a transmission path of torque after the gear shifting is terminated, included in the embodiment shown in FIG. 1.

Herein, when the gear ratio of the input shaft 8 to the output shaft 20 is made to be the second gear ratio, as shown in FIG. 4, the dog clutch (hub 17) is linked with the gear 11 and the gear 11 is linked with the output shaft 20. Upon completion of this link, the pressure force of the clutch 10 is released by controlling the actuator 31. Then, the gear shifting from the first to the second gear is completed. In this second gear driving state, the torque of the engine 1 is transmitted through the output shaft 3, the clutch 4, the input shaft 8, the gear 6, the gear 11, the hub 17 and the output shaft 20 of the engine 1 in this describing order.

As set forth above, in the gear shifting, the state is neutralized by releasing the first gear state. At this time, the torque of the engine 1 is transmitted to the axle 22 through the clutch 10 and the gears 5 and 9. Hence, the lowered torque in the gear shifting can be corrected.

Figure 5:
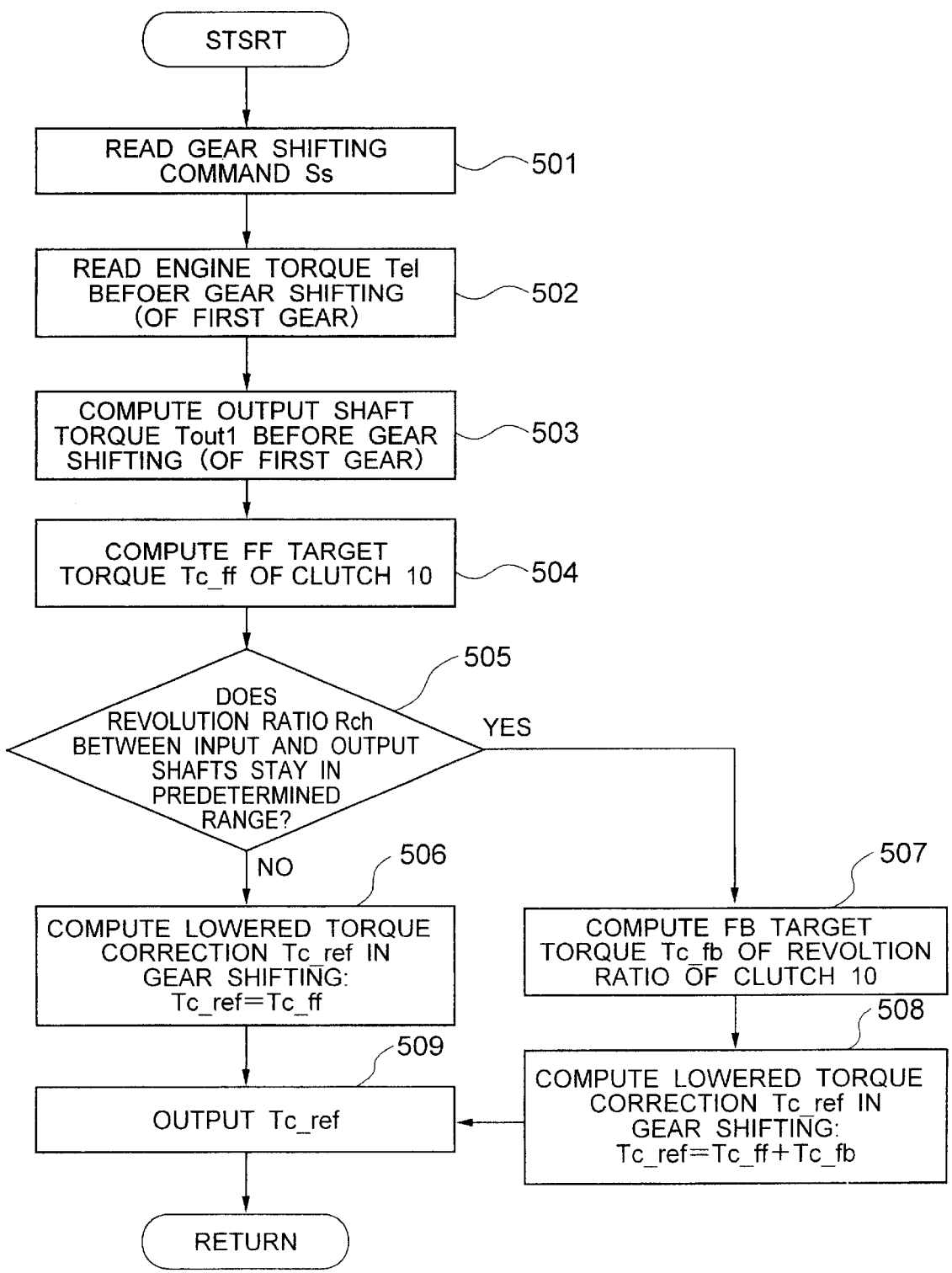
FIG. 5 is a flowchart showing a control process in a lowered torque correcting unit shown in FIG. 1.
Figure 6:
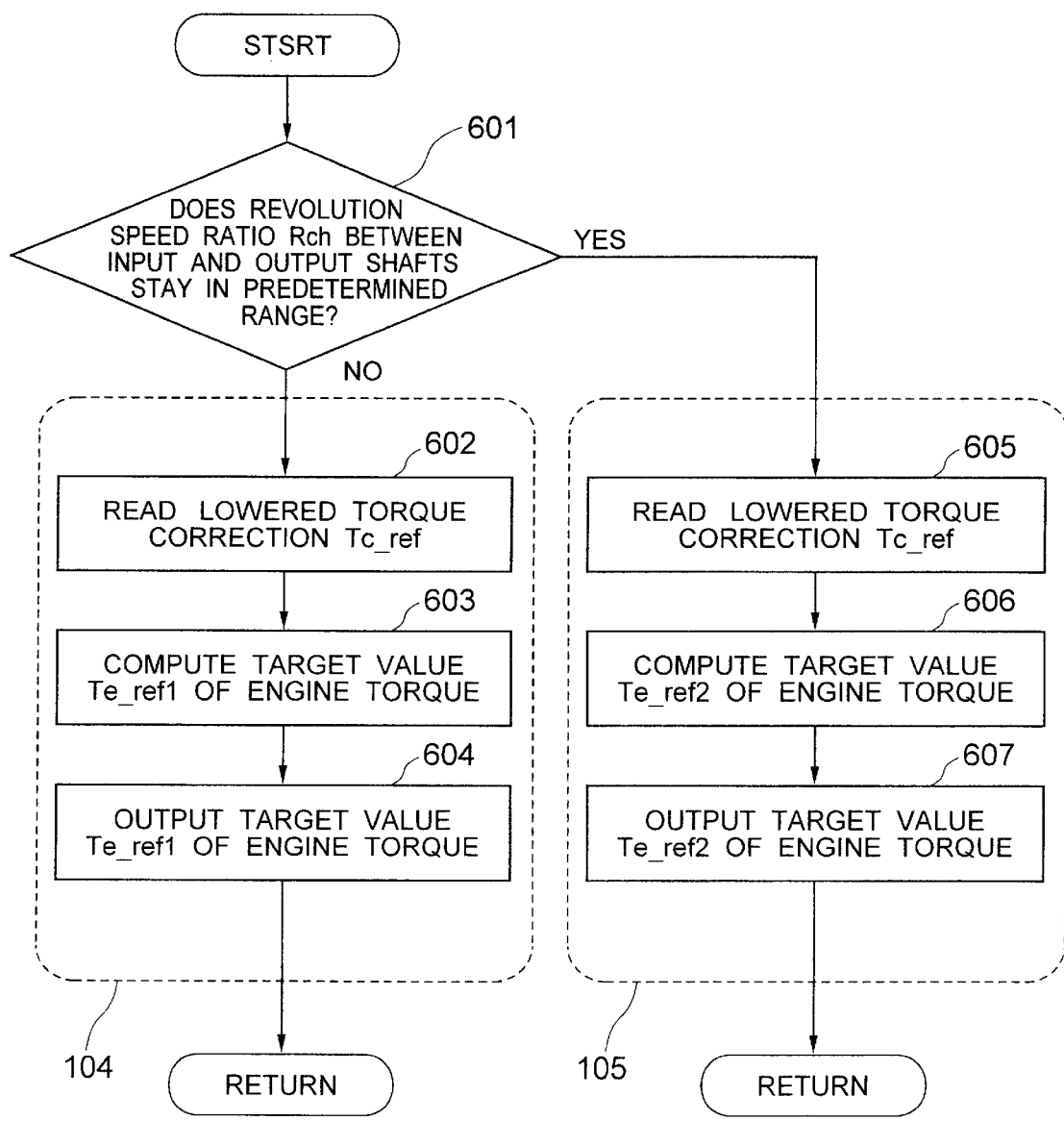
FIG. 6 is a flowchart showing a control process in a revolution speed control unit and a torque adjusting unit shown in FIG. 1.
Figure 7:
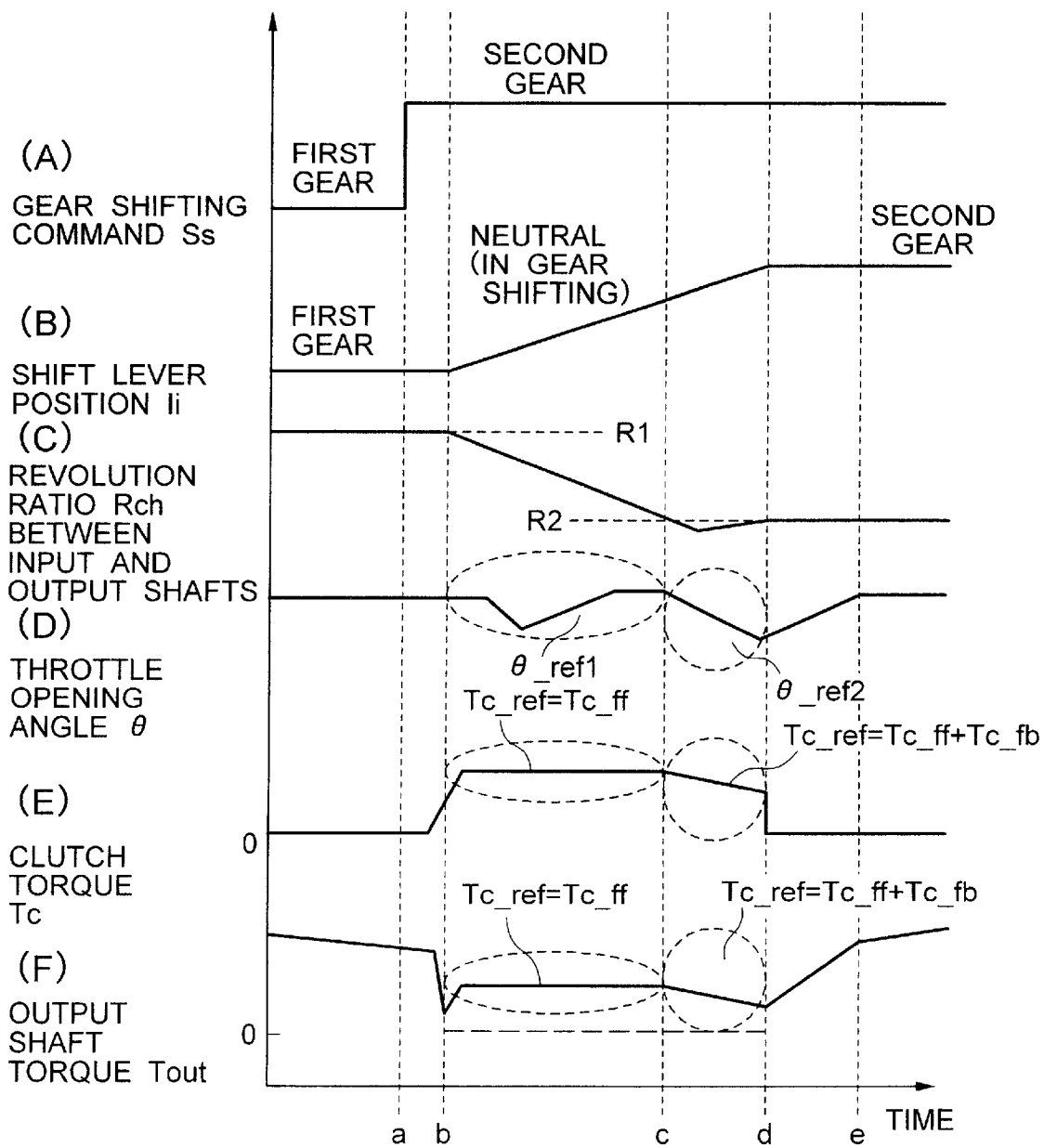
FIG. 7 is a time chart showing a control state in gear shifting in the embodiment shown in FIG. 1.

Then, the description will be oriented to the control method in the gear shifting in the apparatus of controlling a vehicle according to this embodiment with reference to FIGS. 5 to 7.

At first, the control processing content of the lowered torque correcting unit 103 will be described below.

FIG. 5 is a flowchart showing a control process in the lowered torque correcting unit 103.

Step 501

An operation is executed to read the gear shifting command Ss outputted from the gear shifting command generating unit 102.

Step 502

An operation is executed to read the torque Te1 of the engine 1 before the gear shifting (first gear) transmitted from the control device 34 through the LAN.

Step 503

An operation is executed to compute the torque Tout1 of the output shaft 20 before the gear shifting (first gear) on the basis of the torque Te1 of the engine before the gear shifting, read in the step 502.

Step 504

An operation is executed to compute an FF (Feed Forward) target torque Tc_ff of the clutch 10 on the basis of the torque Tout1 of the output shaft 20 computed in the step 503. Assuming that a first gear ratio is R1, a second gear ratio is R2, the engine speed before gear shifting is Ne1, and the engine speed after gear shifting (second gear) is Ne2, the engine speed Ne2 after gear shifting may be presumed as Ne2 Ne1*(R2/R1). Then, the engine torque after gear shifting and the output shaft torque Tout2 after gear shifting may be derived according to the presumed engine speed Ne2 and the throttle opening angle. The FF target torque Tc_ff of the clutch 10 can be derived according to this estimated Tout2. Further, the FF target Tc_ff of the clutch 10 may be constantly derived on the basis of the sensed engine speed Ne and the engine torque Te in order to meet the predetermined gear shifting time according to various running statuses.

Step 505

It is determined whether or not the input/output (I/O) shaft revolution speed ratio Rch determined on the engine speed Ne (revolution speed Nin of the input shaft) and the revolution speed No of the output shaft stays in a predetermined range. If not, the process goes to a step 506, while if yes, the process goes to a step 507.

Step 506

If the revolution speed ratio Rch of the input shaft does not stay in the predetermined range, the lowered torque correction Tc_ref during the gear shifting is computed as Tc_ref=Tc_ff.

Step 507 During the gear shifting, if the revolution speed ratio Rch of the I/O shaft stays in the predetermined range, the deviation between the target revolution speed ratio corresponding to the second gear ratio and the revolution speed ratio Rch of the I/O shaft is fed back so that it is used for computing the target torque Tc_fb of the revolution speed ratio FB (Feed Back) of the clutch 10. At this time, the target engine speed (the revolution speed of the input shaft) is computed according to the target revolution speed ratio and the engine speed Ne is fed back so that it is used for computing the target torque Tc_fb of the revolution speed ratio FB of the clutch 10.

Step 508

The lowered torque correction Tc_ref in gear shifting is computed as Tc_ref=Tc_ff+Tc_fb.

Step 509

The lowered torque correction Tc_ref derived in the steps 506 and 508 is outputted as the target torque of the clutch 10. The outputted lowered torque correction Tc_ref is transmitted to the control device 33 through the LAN.

The control device 33 is served to hydraulically drive the actuators 29 to 33 and adjust the pressure force of the clutch and correct the lowered torque in gear shifting by controlling the actuator 31 on the value of Tc_ref.

As set forth above, the lowered torque correcting unit 103 is served to correct the lowered value of the output shaft 20 in gear shifting and thereby improve the gear shifting performance.

Then, the description will be oriented to the control process content in the revolution speed control unit 104 and the torque adjusting unit 105.

FIG. 6 is a flowchart showing control processes in the revolution speed control unit 104 and the torque adjusting unit 105.

Step 601

It is determined whether or not the revolution speed ratio Rch of the I/O shaft derived on the engine speed Ne (revolution speed of the input. shaft Nin) and the revolution speed No of the output shaft stays in the predetermined range. If not, the process goes to a step 602 in which the control process is executed by the revolution speed control unit 104. If yes, the process goes to a step 605 in which the control process is executed by the torque adjusting unit.

At first, the description will be oriented to the control process content of the revolution speed control unit 104 to be executed in steps 602 to 604.

Step 602

An operation is executed to read the lowered torque correction Tc_ref derived by Tc_ref=Tc_ff.

Step 603

An operation is executed to compute the target torque Te_ref1 of the engine 1 for achieving such an engine speed Ne as realizing the predetermined revolution speed ratio Rch of the I/O shaft on the basis of the lowered torque correction Tc_ref read in the step 602.

Step 604

An operation is executed to output the target torque Tc_ref1 of the engine 1 derived in the step 603.

The control device 34 is served to control the electronic control throttle 2 so that the engine 1 may reach the target torque Te_ref1.

Further, in the revolution speed control unit 104, in order to achieve the target torque Te_ref1 of the engine 1, it is possible to control an air/fuel ratio of the engine 1 or an ignition timing.

As described above, the revolution speed control unit 104 is served to control the revolution speed of the input shaft 8 in gear shifting so that the dog clutch may be coupled to the second gear. Further, it serves to suppress the inertia torque in the second gear link, thereby improving the gear shifting performance.

In turn, the description will be oriented to the control process content of the torque adjusting unit 105 to be executed in steps 605 to 607.

Step 605

An operation is executed to read the lowered torque correction Tc_ref derived by the expression of Tc_ref=Tc_ff+Tc_fb.

Step 606

An operation is executed to compute such target torque Te_ref2 of the engine 1 as reducing a deviation between the output shaft torque after gear shifting and the lowered torque correction Tc_ref as much as possible, based on the lowered torque correction Tc_ref read in the step 605.

Step 607

An operation is executed to output the target torque Te_ref2 of the engine 1 derived in the step 606. The target torque Te_ref2 of the engine 1 is transmitted to the control device 34 through the LAN.

The control device 34 is served to control an electronic control throttle 2 so that the engine 1 may reach the target torque Te_ref2.

Further, the torque adjusting unit 105 may be served to control the fuel/air ratio of the engine and the ignition timing so that the engine 1 may reach the target torque Te_ref2.

As set forth above, the torque adjusting unit 105 is served to control the torque of the input shaft 8 at the termination of the gear shifting so that a deviation between the lowered torque correction in gear shifting and the torque of the output shaft 20 after gear shifting may be reduced as much as possible. This makes it possible to lessen the torque abrupt change, thereby improving the gear shifting performance.

Next, the operation in gear shifting will be described below.

FIG. 7 is a time chart showing a control state in gear shifting. In FIG. 7. (A) denotes a gear shifting command Ss. (B) denotes a shift lever position Ii corresponding to the dog clutch position. (C) denotes a revolution speed ratio Rch of the input shaft. (D) denotes a throttle opening angle θ. (E) denotes a torque Tc of the clutch 10. (F) denotes a torque Tout of the output shaft 20. An axis of abscissa denotes a time.

As indicated in (A), when a gear shifting command Ss for shifting a first gear state to a second gear one at a point a is outputted when a vehicle is running in the first gear state, the gear shifting control is started. As indicated in (E), the torque Tc of the clutch 10 is gradually increased.

With increase of the torque Tc of the clutch 10, as indicated in (F), the torque Tout of the output shaft 20 is gradually decreased. At a point b, the dog clutch coupled to the first gear side enters into the releasable state. This is because the torque being transmitted through the gears 5 and 9 serves to reduce the torque being transmitted through the gears 7 and 18 to a value at which the dog clutch may be released.

If the dog clutch is to be released, the dog clutch is released from the first gear side by controlling the actuator 30. As indicated in (B), the shift lever position Ii enters into the neutral state (in gear shifting), in which the actual gear shifting is started.

When the shift lever position Ii enters into the neural state, as indicated in (E), the control for the clutch 10 is started so that the lowered value of the torque in gear shifting may be corrected. By controlling the actuator 31 according to the target torque Tc_ref=Tc_ff of the clutch 10 outputted from the lowered torque correcting unit 103, as indicated in (F), an operation is executed to correct the lowered value of the torque of the output shaft 20 in gear shifting.

At a time, since the torque transmitted by the clutch 10 is made to be the torque of the output shaft 20, for reducing the abnormal feeling a passenger in a vehicle feels, it is preferable to provide the target torque Tc_ref of the clutch 10 with a smooth characteristic. In gear shifting, it is necessary to swiftly and smoothly control the revolution speed ratio Rch of the input/output shafts to be a second gear ratio R2 during the gear shifting.

Hence, in order to achieve the target torque Te_ref1 of the engine 1 outputted from the revolution speed control unit 104, as indicated in (D), an operation is executed to control the throttle opening angle to be θ=θ_ref1 for adjusting the engine speed Ne and making the revolution speed ratio Rch of the I/O shaft closer to the second gear ratio R2.

By controlling the clutch 10 and the electronic control throttle 2 as mentioned above, as indicated in (C), the revolution speed ratio Rch of the I/O shafts is made to be Rch=R2 at a point c. In order to engage the dog clutch, it is preferable to suit the revolution speed ratio Rch of the I/O shafts to the second gear ratio Rc for increasing the engine speed Ne. This reason is as follows. Since the revolution speed No of the output shaft 20 is increased by the lowered torque correction given in gear shifting, if the dog clutch is to be engaged when the revolution speed of the input shaft 8 is likely to be increased, the torque interference in the engaged portion of the dog clutch is brought about so that the dog clutch is difficult to be engaged. Hence, it is preferable to engage the dog clutch as increasing the revolution speed of the input shaft 8 because the torque interference is reduced.

Since Rch<R2 at the point c, it is necessary to increase the revolution speed ratio Rch of the input/output shafts. Immediately before the engagement (between the c and the d points), a response is slightly delayed in the control of the engine torque Te. Hence, it is preferable to adjust the revolution speed ratio Rch of the I/O shafts by means of the torque of the clutch 10. Hence, In the interval between the c and the d points, an operation is executed to add a revolution speed ratio FB target torque Tc_fb of the clutch 10 according to a deviation of the revolution speed ratio Rch of the I/O shafts to the second gear ratio Rc and set the target torque of the clutch 10 as Tc_ref=Tc_ff+Tc_fb.

As set forth above, only in the interval when a deviation between the revolution speed ratio Rch of the I/O shaft and the second gear ratio R2 is small, by feeding back the revolution speed ratii), it is possible to suppress the torque variation of the lowered torque correction in gear shifting to a minimum and thereby alleviate the abnormal feeling a passenger in a vehicle feels. By the revolution speed ratio FB control of the clutch 10 as mentioned above, the revolution speed ratio Rch of the I/O shaft is on the fly of increasing, hence, Rch R2 is met. It means that the dog clutch may be linked to the second gear.

If the dog clutch may be coupled to the second gear, the dog clutch is coupled to the second gear by controlling the actuator 30. At a time, it is preferable to reduce a deviation between the lowered torque correction Tc_ref=Tc_ff+Tc_fb in gear shifting and the torque of the output shaft 20 after the gear shifting (coupled to the second gear), thereby reducing the torque abrupt change of the output shaft 20 at the termination of the gear shifting.

The lowered torque correction in gear shifting is determined by the torque Tc of the clutch 10 and the torque of the output shaft 20 after the gear shifting is determined by the torque Te of the engine 1 and the second gear ratio R2. Between the c and the d points, the throttle opening angle is controlled to be θ=θ_ref2 so that the engine 1 reaches the target torque Te_ref2. During the gear shifting, the clutch 10 is made slipping. Hence, if the torque Te of the engine 1 is greater than the predetermined value, the lowered torque correction in gear shifting is determined by the torque Tc of the clutch 10. Hence, tide torque adjusting control in terminating the igear shifting can be executed independently of the control for correcting the lowered torque in gear shifting.

At a d point, the dog clutch is linked to the second gear and the actual gear shifting is completed. Then, the throttle opening angle θ is gradually reduced to the opening angle before the gear shifting. At a point e, the gear shift control is terminated.

As set forth above, according to this embodiment, in the gear shifting, an operation is executed to derive the lowered torque correction of the output shaft 20 in gear shifting, control the revolution speed of the input shaft 8 on the basis of the correction, and adjust the torque of the input shaft 8 at the termination of the gear shifting, thereby making it possible to suppress the torque variation of the output shaft 20.

In turn, the description will be oriented to the arrangement of the apparatus of controlling a vehicle according to an embodiment of the present invention with reference to FIGS. 8 to 11.

Figure 8:
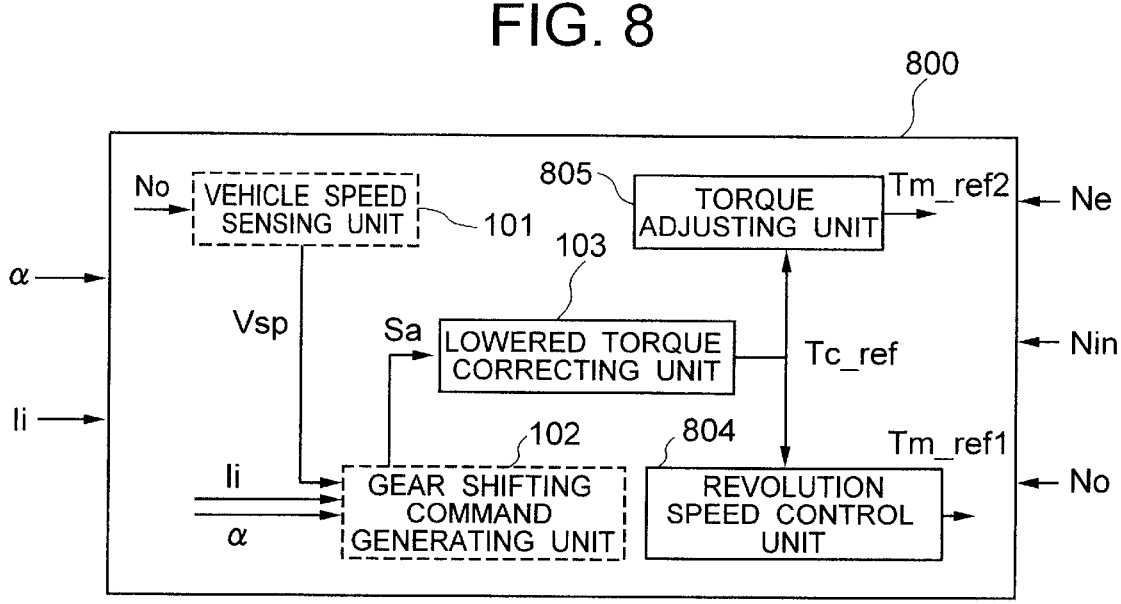
FIG. 8 is a block diagram showing an apparatus of controlling a vehicle according to another embodiment of the present invention.

FIG. 8 is a block diagram showing the control apparatus according to this embodiment. The overall system arrangement of the vehicle is likewise to that shown in FIG. 1 and thus is not described herein. In addition, the same components in FIG. 8 as those of the embodiment shown in FIG. 1 have the same reference numbers.

The control apparatus 800 includes a vehicle speed sensing unit 101, a gear shifting command generating unit 102, a lowered torque correcting unit 103, a revolution speed control unit 804, and a torque adjusting unit 805. The control apparatus may be realized by the same computer as that of the control apparatus 100.

The control process contents of the vehicle speed sensing unit 101 and the gear shifting command generating unit 102 are likewise to those of the embodiment shown in FIG. 1 and thus are not describe herein.

Herein, the description will be oriented to the control of the clutch 10 and the motor 27 in shifting the first gear driving state to the second gear driving state.

Figure 9:
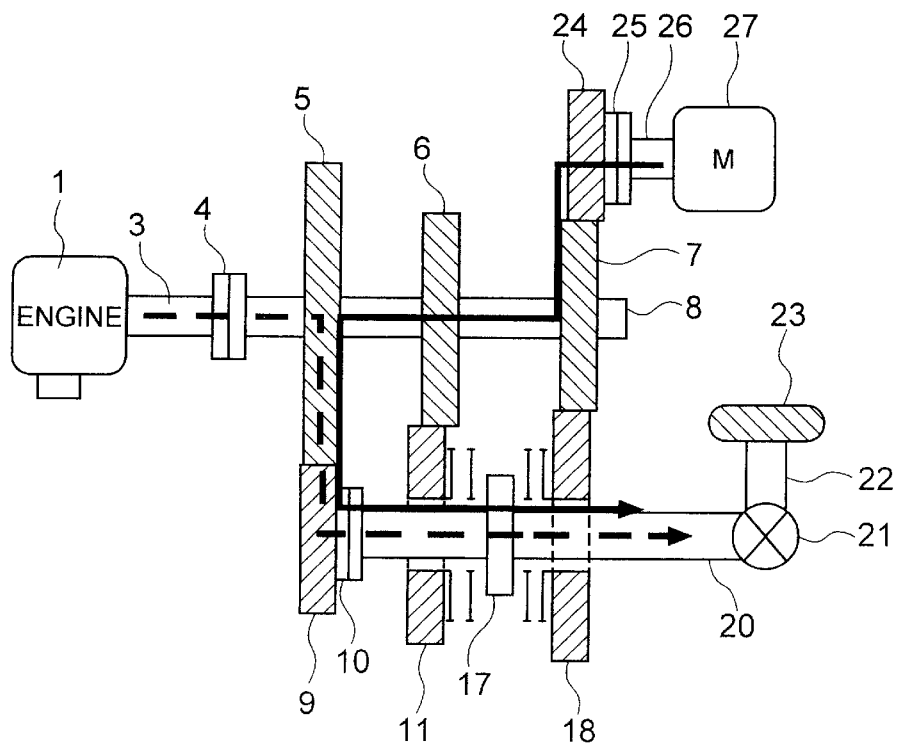
FIG. 9 is a view showing a transmission path of torque in gear shifting in the embodiment shown in FIG. 8.

When the gear shifting command generating unit 102 is served to output the gear shifting command Ss, as shown in FIG. 9, the dog clutch (hub 17) is made released so that the gear 18 is released from the output shaft 20. At a time, the clutch 25 is kept in the engagement state by controlling the actuator 29. The torque of the motor 27 is transmitted in a path of the output shaft 26 of the motor 27, the clutch 25, the gear 24, the gear 7, the input shaft 8, the gear 5, the gear 9, the clutch 10, and the output shaft 20 in this describing order. This makes it possLble for the motor 27 to control the revolution speed of the input shaft 8 and thus to adjust the torque.

In gear shifting, by pressing the clutch 10 by controlling the actuator 31, the torque of the engine 1 is transmitted to the output shaft 20 through the gears 5 and 9. The pressure force of this clutch 10 allows the torque of the engine 1 to transmit as the driving torque of the vehicle to the axle 22. Since the gear ratio is changed into a small ratio by means of the gears 5 and 9, the load of the engine 1 is made larger so that the engine speed is made lower. The gear ratio of the output shaft 20 to the input shaft 8 comes closer to the second gear ratio (smaller) rather than the first gear ratio.

At a time, the transmission path of the torque of the engine 1 is composed of the output shaft 3, the clutch 4, the gear 5, the gear 9, the clutch 10, and the output shaft 20. When the gear ratio of the input shaft 8 to the output shaft 20 is made to be the second gear ratio, the dog clutch is coupled to the gear 11 so that the gear 11 may be linked with the output shaft 20. At a time when the dog clutch is coupled to the second gear state, the actuator 31 is controlled so that the pressure force of the clutch 10 is released and then the gear shifting is completed.

As set forth above, though the first gear state is released into the neutral state, the torques of the engine 1 and the motor 27 are transmitted to the axle 22 through the output shaft 20 by means of the clutch 10 and the gears 5 and 9. Hence, the lowered value of the torque in the gear shifting can be corrected.

Figure 10:
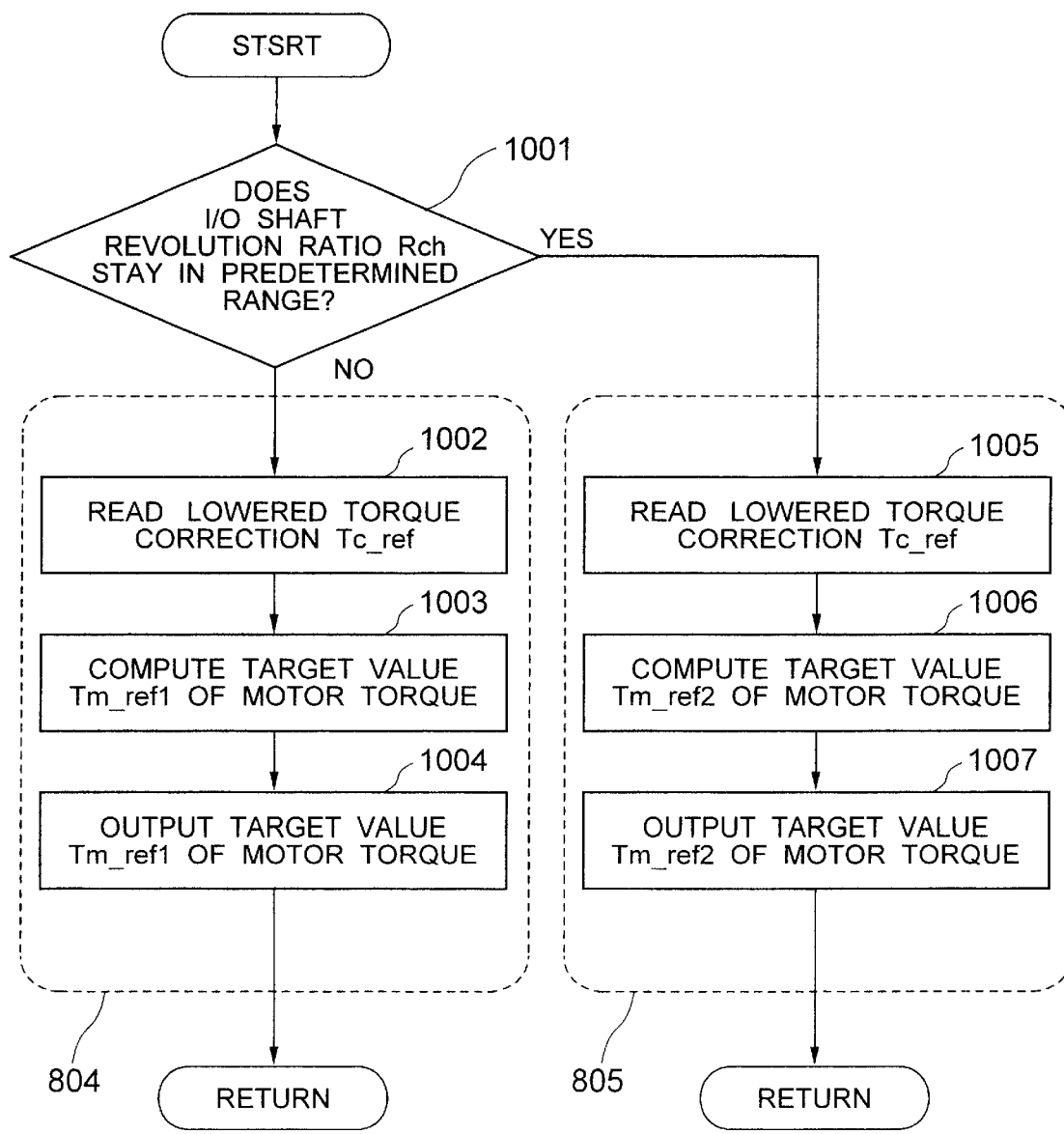
FIG. 10 is a flowchart showing a control process to be executed in the revolution speed control unit and the torque adjusting unit shown in FIG. 8.
Figure 11:
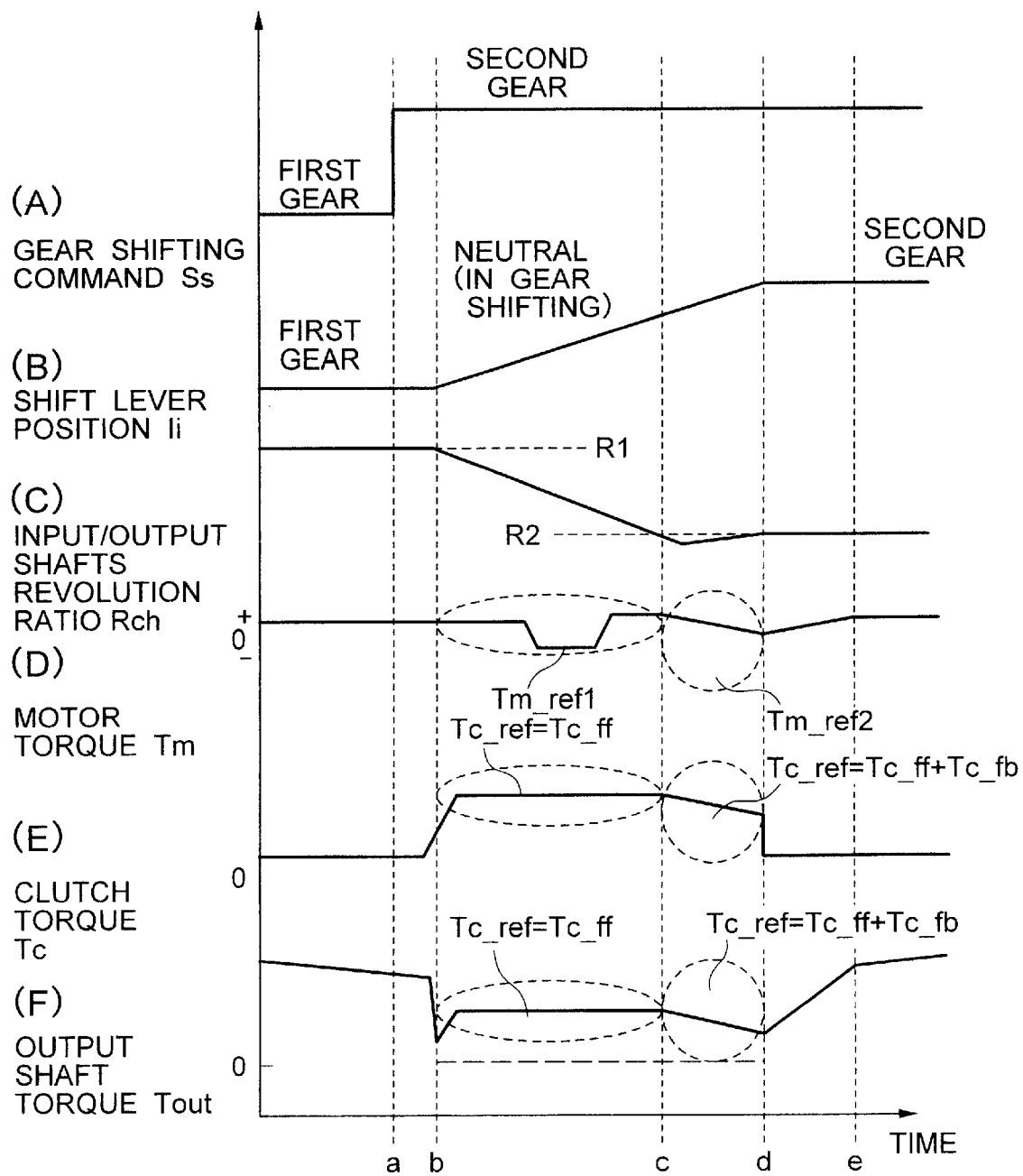
FIG. 11 is a time chart showing a control state in gear shifting in the embodiment shown in FIG. 8.

Then, the description will be oriented to the control method in gear shifting to be executed in the apparatus of controlling a vehicle according to this embodiment with reference to FIGS. 10 and 11. The control process content in the lowered torque correcting unit 103 is likewise to that described with reference to FIG. 5 and thus is not described herein.

At first, the description will be oriented to the control process content to be executed by the revolution speed control unit 804 and the torque adjusting unit 805 with reference to FIG. 10. FIG. 10 is a flowchart showing a control process to be executed by the revolution speed control unit 804 and the torque adjusting unit 805.

In step 1001, an operation is executed to determine whether or not the revolution speed ratio Rch of the I/O shafts derived on the basis of the engine speed Ne (the revolution speed Nin of the input shaft) and the revolution speed No of the output shaft stays in a predetermined range.

If not, the process goes to a step 1002 in which the control process is executed by the revolution speed control unit 804, while if yes, the process goes to a step 1005 in which the process is executed by the torque adjusting unit 805.

At first, the description will be oriented to the control process content of the revolution speed control unit 804 to be executed in stepe 1002 to 1004.

In the step 1002, an operation is executed to read the lowered torque correction Tc_ref derived by Tc_ref=Tc_ff.

In the step 1003, an operation is executed to compute such a target torque Tm_ref1 of the motor 27 as meeting the engine speed Ne for realizing the predetermined revolution speed ratio Rch of the I/O shafts on the basis of the lowered torque correction Tc_ref read in the step 1002.

In the step 1004, an operation is executed to output the target torque Tm_ref1 of the motor 27 derived in the step 1003. This target torque Tm_ref1 of the motor 27 is transmitted to the control device 35 through the LAN.

The control device 35 is served to control the motor 27 and the battery 28 so that the motor 27 may reach the target torque Tm_ref1.

As set forth above, the revolution speed control unit 804 is served to control the revolution speed of the input shaft 8 in gear shifting so that the dog clutch may be coupled to the second gear state. It further serves to suppress the inertia torque in the second gear engagement and thereby improve the gear shifting performance.

In turn, the description will be oriented to the control process of the torque adjusting unit 805 to be executed in steps 1005 to 1007.

In the step 1005, an operation is executed to read the lowered torque correction Tc_ref derived by the expression of Tc_ref=Tc_ff+Tc_fb.

In the step 1006, an operation is executed to compute such a target torque Tm_ref2 of the motor 27 as reducing a deviation between the output shaft torque after the gear shifting and the lowered toque correction Tc_ref, based on the lowered torque correction Tc_ref read in the step 1005.

In the step 1007, the target torque Tm_ref2 of the motor 27 derived in the step 1006 is outputted. This target torque Tm_ref2 of the motor 27 is transmitted to the control device 35 through the LAN.

The control device 35 serves to control the motor 27 and the battery 28 so that the motor 27 may reach the target torque Tm_ref2.

As set forth above, the torque adjusting unit 805 is served to control the torque of the input shaft 8 at the termination of the gear shifting and thereby reduce a deviation between the lowered torque correction in the gear shifting and the torque of the output shaft 20 after the gear shifting, thereby lessening the torque abrupt change and improving the gear shifting performance.

In turn, the operation in the gear shifting will be described below.

FIG. 11 is a time chart showing the control state in the gear shifting. In FIG. 11, (A) denotes a gear shifting command Ss. (B) denotes a shift lever position Ii corresponding to the dog clutch position. (C) denotes a revolution speed ratio Rch of the I/O shafts. (D) denotes a torque Tm of the motor 27. (E) denotes a torque Tc of the clutch 10. (F) denotes a torque Tout of the output shaft 20. In addition, an axis of abscissa denotes a time.

As indicated in (A), when the second gear shifting command Ss is outputted at the point a while the vehicle is running in the first gear state, as indicated in (E), the torque Tc of the clutch 10 is gradually increased.

With increase of the torque Tc of the clutch 10, as indicated in (F), the torque Tout of the output shaft 20 is gradually decreased and at the point b, the dog clutch coupled to the first gear side may be released. This is because the torque transmitted by the gears 5 and 9 serves to reduce the torque transmitted by the gears 7 and 18 to such a value as releasing the dog clutch.

When the dog clutch enters into the releasing state, the actuator 30 serves to release the dog clutch to be uncoupled from the first gear side. Then, as indicated in (B), the shift lever position Ii enters into the neutral state (in gear shifting) in which the actual gear shifting is started.

When the shift lever position Ii enters into the neutral state, as indicated in (E), the control of the clutch 10 is started to correct the lowered value of the torque in the gear shifting. Then, as indicated in (F), the lowered value of the torque of the output shaft 20 in gear shifting can be corrected by controlling the actuator 31 according to the target torque Tc_ref=Tc_ff of the clutch 10 outputted by the lowered torque correcting unit 103.

At this time, since the torque, transmitted through the clutch 10 is made to be the torque of the output shaft 20, for reducing the abnormal feeling a passenger in the vehicle feels, it is preferable to provide the target torque Tc_ref of the clutch 10 with a smooth characteristic. Further, in the gear shifting, it is necessary to swiftly and smoothly control the revolution speed ratio Rch of the I/O shafts to be the second gear ratio R2.

As indicated in (D), therefore, an operation is executed to control the motor 27 and the battery 28 and thereby adjusting the engine speed Ne for achieving the target torque Tm_ref1 of the motor 27 outputted by the revolution speed control unit 804, thereby making the revolution speed ratio Rch of the I,/O shafts closer to the second gear ratio R2.

By this kind of control for the clutch 10 and the motor 27, as indicated in (C), the revolution speed ratio Rch of the I/O shafts is made to be Rch=R2 at the point c. For linking the dog clutch, however, it is preferable to increase the engine speed Ne and suit the revolution speed ratio Rch of the I/O shafts to the second gear ratio R2. The reason is as follows. Since the revolution speed No of the output shaft 20 is increased by the lowered torque correction to be corrected in the gear shifting, if engagement operation of the dog clutch is made as decreasing the revolution speed of the input shaft 8, the torque interference takes place in the engaged portion of the dog clutch, so that the engagement of the dog clutch is made difficult. Hence, it is better to engage the dog clutch as increasing the revolution speed of the input shaft 8, because the torque interference is reduced.

Since Rch<R2 at the point c or later, it is necessary to increase the revolution speed ratio Rch of the I/O shafts. However, immediately before the engaging (between the points c and d), both the torque and the revolution speed of the motor 27 are required to be controlled. If the selected motor 27 allows either one of the torque control and the revolution speed control to be executed, it is necessary to adjust the revolution speed ratio Rch of the I/O shafts by means of the torque of the clutch 10. In the interval between the points c and d, therefore, an operation is executed to add the revolution speed ratio FB target torque Tc_fb of the clutch 10 according to a deviation between the revolution speed ratio Rch of the I/O shafts and the second gear ratio R2 and to set the target torque of the clutch 10 to Tc_ref=Tc_ff+Tc_fb.

As set forth above, by feeding back the revolution speed ratio only in the interval when the deviation between the revolution speed ratio Rch of the I/O shafts and the second gear ratio R2 is small, it is possible to suppress the torque variation of the lowered torque correction in the gear shifting to a minimum and thereby alleviate the abnormal feeling a passenger in the vehicle feels. By the revolution speed ratio FB control of the clutch 10, the revolution speed ratio Rch of the I/O shafts is made to be Rch R2 on the increase and the dog clutch enters into the the state possible to couple to the second gear.

When the dog clutch enters into the second gear engageable state, by controlling the actuator 30, the dog clutch is coupled to the second gear. At this time, it is preferable to reduce adeviation between Tc_ref=Tc_ff+Tc_fb corresponding to the lowered torque correction in the gear shifting and the torque of the output shaft 20 after the gear shifting (after coupled to the second gear), thereby lessening the torque abrupt change of the output shaft 20 at the termination of the gear shifting.

The lowered torque correction in the gear shifting is determined by the torque Tc of the clutch 10. The torque of the output shaft 20 after the gear shifting is determined by the torque Te of the engine 1, the torque Tm of the motor 27 and the second gear ratio R2. Hence, between the points c and d, the motor 27 and the battery 28 are controlled so that the target torque Tm_ref2 of the motor 27 may be achieved. In the gear shifting, the clutch 10 is in the slipping state. Hence, if a sum of the torque Te of the engine 1 and the torque Tm of the motor 27 is greater than a predetermined value, the lowered torque correction in the gear shifting is determined by the torque Tc of the clutch 10. Hence, the torque adjusting control at the termination of the gear shifting can be executed independently of the control for correcting the lowered torque correction in the gear shifting.

At the point d, the dog clutch is coupled to the second gear and then the actual gear shift is completed. Upon completion of the gear shift, the torque Tm of the motor 27 is gradually returned to zero. At the point e, the gear shifting control is terminated.

As set forth above, according to this embodiment, in the gear shifting, an operation is executed to derive the lowered torque correction of the output shaft 20, control the revolution speed of the input shaft 8 on the basis of the lowered torque correction, and adjust the torque of the input shaft 8 at the termination of the gear shifting, thereby suppressing the torque variation of the output shaft 20 and thereby improving the gear shifting performance.

The present invention is not limited to the system arrangement according to each of the foregoing embodiments. It may be the apparatus of controlling a vehicle without using the motor 27. Further, the clutches 4 and 10 may be any kind of friction clutch such as a dry type single plate clutch, a multiplate wet friction clutch and an electromagnetic clutch. The clutch 25 may be any kind of clutch such as a dry type single plate clutch, a multiplate wet clutch, an electromagnetic clutch, and a dog clutch.

As set forth above, the invention is arranged to suppress the torque variation of the output shaft caused by the control for the revolution speed in the gear shifting and adjust the torque of the input shaft at the termination of the gear shifting, thereby reducing the torque abrupt change of the output shaft and improve the gear shifting performance of a vehicle.

Figure 12:
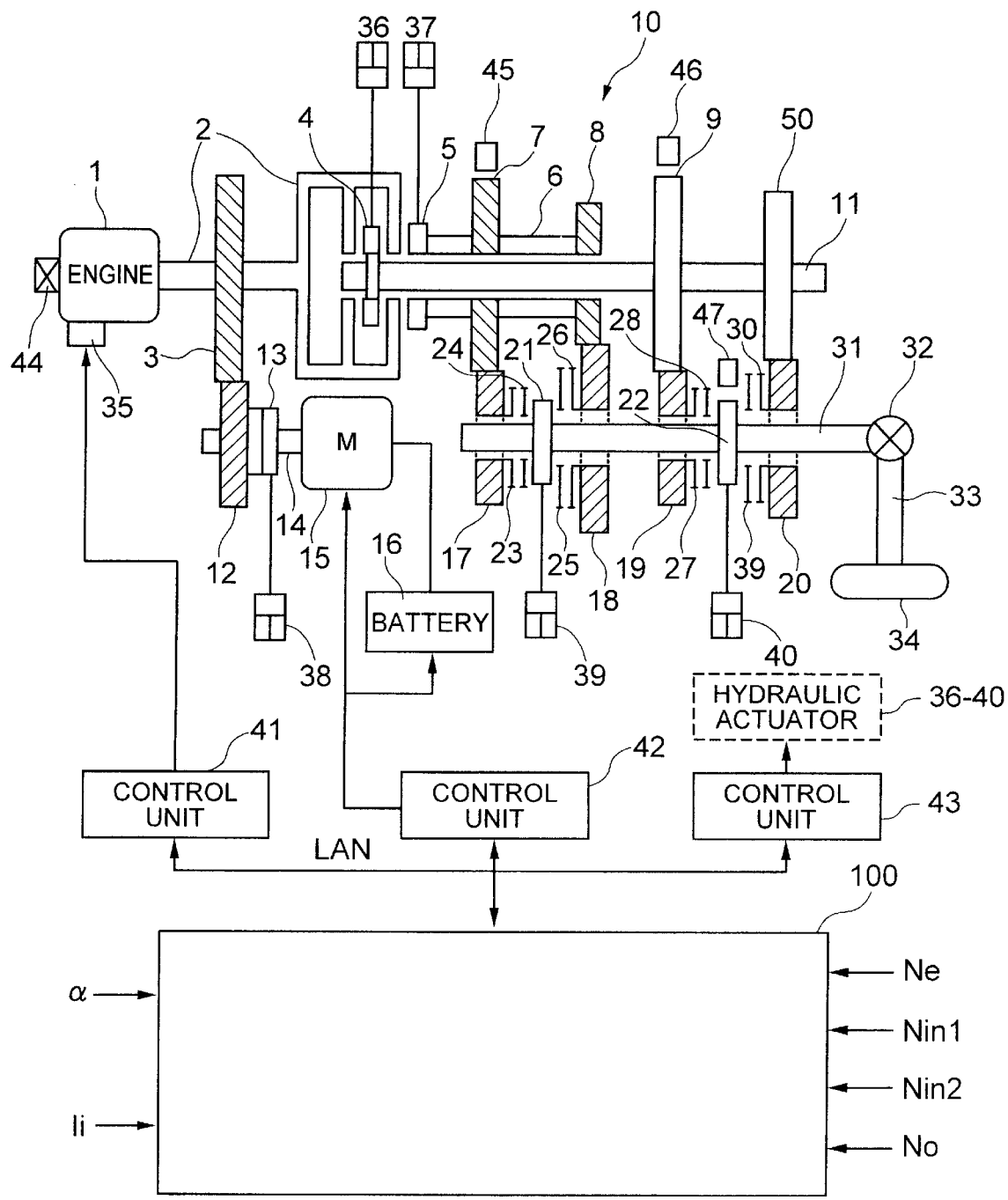
FIG. 12 is a diagram showing a vehicle system according to another embodiment of the present invention.

FIG. 12 is a block diagram showing a vehicle system and its control apparatus according to another embodiment of the present invention.

A clutch 5 is located between an output shaft 2 of the engine 1 and a first input shaft 6 of a gear drive transmission 50 so that the torque of the engine 1 may be transmitted to the first input shaft 6. The clutch 5 may be a multiplate wet type one. The hydraulic actuator 37 may be used for controlling the pressure force of the clutch 5. By adjusting the pressure force of the clutch 5, the power transmission between the output shaft 2 of the engine 1 and the first input shaft 6 is disconnected.

A clutch 4 is located between the output shaft 2 of the engine and a second input shaft 11 of the gear drive transmission 50 so that the torque of the engine 1 may be transmitted to the second input shaft 11. The clutch 4 may be a multteplate wet type one. The hydraulic actuator 36 is used for controlling the pressure force. By adjusting the pressure force of the clutch 4, the power transmission from the output shaft 2 of the engine 1 to the second input shaft 11 is disconnected.

The first input shaft 6 includes gears 7 and 8 fixed thereto. The second input shaft 11 includes gears 9 and 10 fixed thereto. Since the first Input shaft 6 is hollow, the second input shaft 11 passes through this hollow portion so that the second input shaft 11 may be relatively moved in the rotating direction against the first input shaft 6.

The output shaft 2 of the engine 1 includes a gear 3 fixed thereto. The output shaft 14 of the motor 15 is connected to a gear 12 provided with the clutch 13. This gear 12 is constantly engaged with the gear 3. The clutch 13 may be a dry type single plate one. The output torque of the motor 15 may Tbe transmitted to the gear 12. The pressure force of this clutch 13 may be controlled by the hydraulic actuator 38. By adjusting the pressure force of the clutch 13, the power transmission from the output shaft 14 to the output shaft 2 of the engine 1 can be disconnected.

The output shaft 31 of the gear drive transmission 50 includes a gear 17 provided with a toothed wheel 23 and a synchronizer ring 24, a gear 18 provided with a toothed wheel 26 and a synchronizer ring 25, and a hub 21 and a sleeve (not shown) for directly connecting between the gears 17 and 18 and the output shaft 31. The gears 17 and 18 provide their stoppers (not shown) so that they are not allowed to be moved in the axial direction of the output shaft 31. The hub 21 includes a plurality of grooves (not shown) to be engaged with a plurality of grooves (not shown) of the output shaft 31. This hub 21 is hence allowed to be relatively moved in the axial direction of the output shaft 31 but is engaged with the output shaft 31 so that it serves to limit the movement in the rotating direction. Hence, the torque of the hub 21 can be transmitted to the output shaft 31.

In order to transmit the torque from the first input shaft 6 to the hub 21, it is necessary to move the hub 21 and the sleeve in the axial direction of the output shaft 31 and directly couple the toothed wheel 23 or 26 with the hub 21 through the synchronizer ring 24 or 25. The hub and the sleeve are moved by the hydraulic actuator 39.

The torque transmitting device is composed of the hub 21 and the sleeve, the toothed wheel 23 and the synchronizer ring 24, and the toothed wheel 26 and the synchronizer ring 25. The claw clutch mechanism served as the torque transmitting device is referred to as a dog clutch.

The mechanism makes it possible to highly efficiently transmit the energy from the power source such as the engine 1 to wheels 34 through a differential device 32 and an axle 33, thereby aiding in lowering fuel consumption.

Likewise, the output shaft 31 of the gear drive transmission 50 includes a gear 17 provided with a toothed wheel 27 and a synchronizer ring 28, a gear 20 provided with a toothed wheel 30 and a synchronizer ring 29, and a hub 22 and sleeve (not shown) for directly coupling the gear 19 with the gear 20 and the output shaft 31. The gears 19 and 20 provide their stoppers (not shown) in order that those gears may not move in the axial direction of the output shaft 31.

Further, the hub 22 includes grooves (not shown) to be engaged with a plurality of grooves (not shown) of the output shaft 31 inside thereof. This hub 22 is engaged with the output shaft 31 so that it may be relatively moved in the axial direction of the output shaft 31 but limited to be moved in the rotating direction. Hence, the torque of the hub 22 is transmitted to the output shaft 31.

In order to transmit the torque from the second input shaft 31 to the hub 22, it is necessary to move the hub 22 and the sleeve in the axial direction of the output shaft 31 and directly couple the toothed wheel 27 or 30 with the hub 22 through the synchronizer ring 28 or 29. The hub 22 and the sleeve are moved by the hydraulic actuator 40.

The gear drive transmission 50 is constructed so that a toothed wheel sequence composer of the gears 8 and 18 corresponds to the first gear, a toothed wheel sequence composed of the gears 10 and 20 corresponds to the second gear, a toothed wheel sequence composed of the gears 7 and 17 corresponds to the third gear, and a toothed wheel sequence composed of the gears 9 and 19 corresponds to the fourth gear.

In the engine 1, the intake air flow is controlled by the electronic control throttle 35 provided in an intake pipe (not shown) so that the fuel injection system (not shown) may inject the fuel corresponding to the intake air flow. Further, the ignition timing is determined on some signals indicating the air/fuel ratio, determined on the air amount and the fuel amount, and the engine speed Ne, and then the ignition system (not shown), is ignited.

The fuel injection system may be an intake port injection system in which fuel is injected to the intake port or an in-cylinder injection system in which fuel is directly injected to the inside of the cylinder. The preferable system is a system that serves to compare the driving area requested by the engine (area determined by the engine torque and the engine speed) for lowering the fuel consumption and enhancing the exhaust performance.

Next, the description will be oriented to the control apparatus 100 for controlling the engine 1, the actuators 36, 37, 38, 39, 40 and the motor 15.

The control apparatus 100 is inputted with an accelerator pedal depress amount signal $\alpha$, a shift lever position signal Ii, an engine speed signal Ne sensed by the sensor 44, a revolution speed signal Nin1 of the first input shaft sensed by the sensor 45, a revolution speed signal Nin2 of the second input shaft sensed by the sensor 46, and a revolution speed signal No of the output shaft sensed by the sensor 47. Then, this control apparatus 100 is served to compute the torque Te of the engine 1 and then transmit it to the control device 41 through the LAN served as a communication medium. The control device 41 is served to compute such a throttle valve opening angle, a fuel amount and an ignition timing as meeting the received engine torque Te, for controlling the corresponding actuator (for example, an electronic control throttle).

Further, the control apparatus 100 is served to compute the torque and the revolution speed of the motor 15 and then transmit them to the control device 42 through the LAN, for controlling the motor. The control device 42 is served to charge the battery 16 with an electric power supplied from the motor 15 and then enable the battery 16 to supply an electric power for driving the motor 15.

In turn, the arrangement of the control apparatus 100 will be described with reference to FIG. 13. The control apparatus 100 includes a vehicle speed sensing unit 101, a gear shifting command generating unit 102, a lowered torque correcting unit 103, a revolution speed control unit 104, and a torque adjusting unit 105.

The vehicle speed sensing unit 101 serves to compute the vehicle speed Vsp based on the revolution speed No of the output shaft sensed by the sensor 47 by means of a function f: Vsp=f(No)

The gear shifting command generating unit 102 is served to determine the gear shifting command Ss on the basis of the inputted accelerator pedal depress amount $\alpha 1$ and the vehicle speed Vsp sensed by the vehicle speed sensing unit 101. This gear shifting command Ss is selected from the values for meeting a maximum efficiency of the engine 1 and the motor 15, which have been derived by an experiment or simulation and stored in the storage unit (not shown) located in the control apparatus 100.

Figure 14:
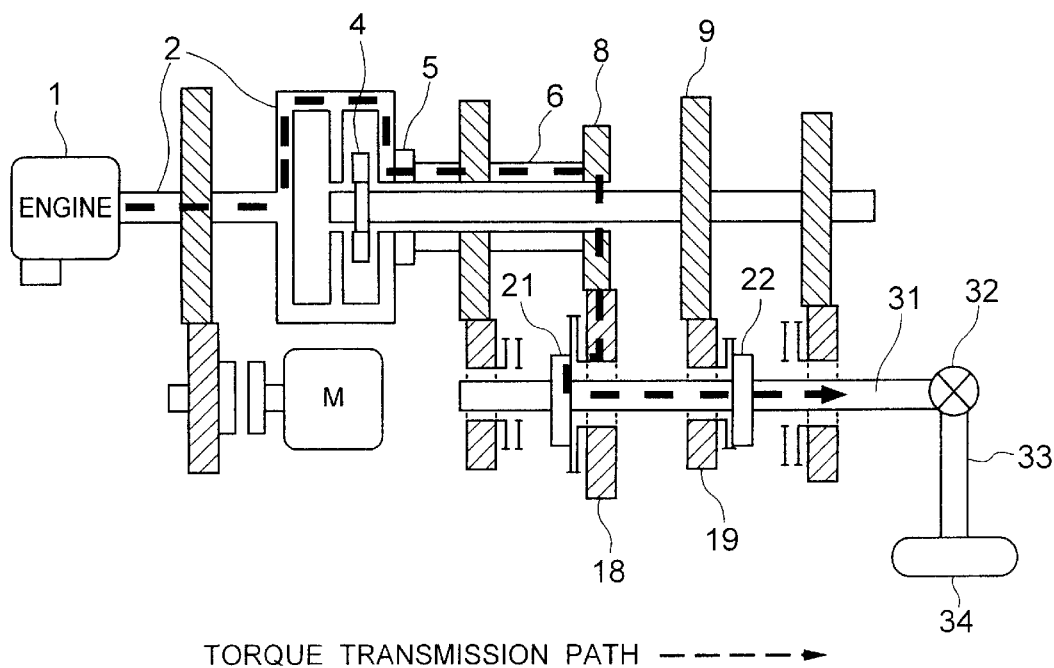
FIG. 14 is an explanatory view showing one gear driving state in acceleration in the embodiment shown in FIG. 12.
Figure 15:
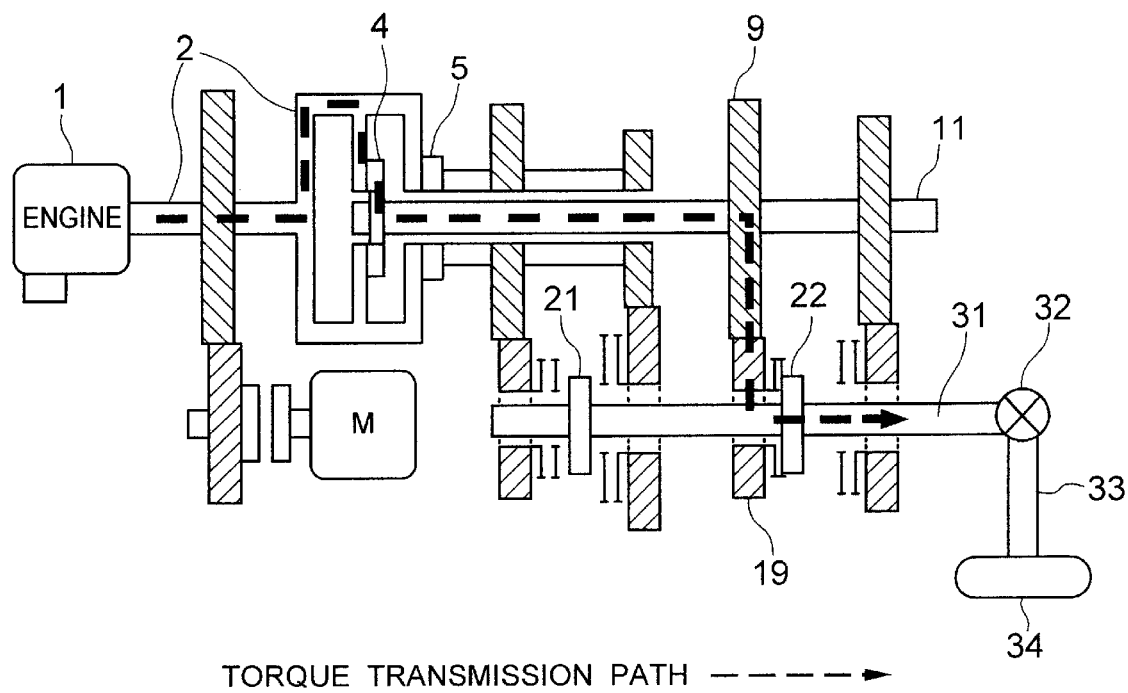
FIG. 15 is an explanatory view showing a state of a gear after outputting a first to third gear shifting command in the embodiment shown in FIG. 12.
Figure 16:
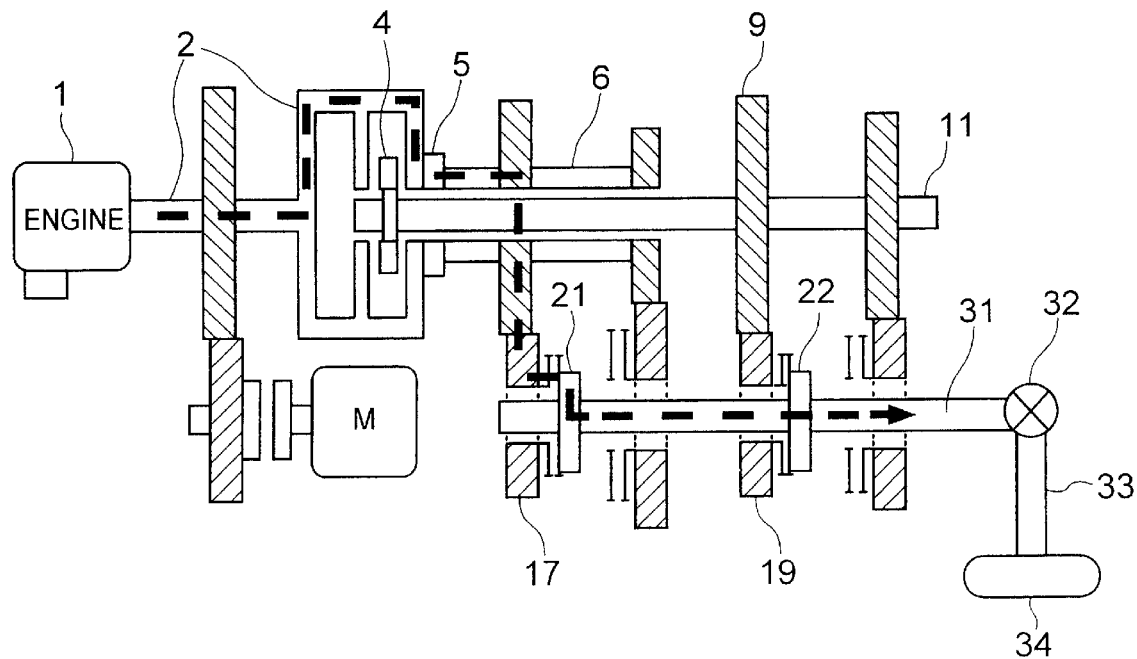
FIG. 16 is an explanatory view showing a third gear driving state in the embodiment shown in FIG. 12.

Then, the description will be oriented to a torque transmitting path composed when the gear stage is changed from the first gear driving state to the third gear one with reference to FIGS. 14, 15 and 16.

FIG. 14 is an explanatory view showing the first gear driving state in the case of accelerating a vehicle when it is run by the driving force of the engine 1, in which a dotted arrow indicates a transmission path of the torque. As an example, it is assumed that a clutch 5 is engaged and a hub 21 is linked with a gear 18. In this state, the torque of the engine 1 is transmitted to an output shaft 31 through an output shaft 2, a clutch 5, a first input shaft 6, a gear 8, a gear 18, and a hub 21. At this time, the clutch 4 is released, so that the hub 22 may be coupled with the gear 19.

When the gear shifting command generating unit 102 outputs a gear shifting command Ss for executing the first to the third gear shifting, as shown in FIG. 15, the hub 21 is released so that the gear 18 may be released from the output shaft 31. At a time, the actuator 36 is controlled so that the clutch 4 is pressed onto the output shaft 2. This pressing engagement allows the output torque of the engine 1 to be transmitted from the output shaft 2 to the output shaft 31 through a clutch 4, a second input shaft 11, a gear 9, a gear 19, and a hub 22. In a case that the pressing force of the clutch 4 serves to transmit the torque of the engine 1 to the axle 33 for driving the vehicle, the use of the gears 9 and 19 makes the gear ratio smaller, thereby making the load of the engine 1 and thereby the revolution speed lower. This results in making the gear ratio of the output shaft 31 to the first input shaft 6 closer to the third gear ratio (that is, smaller) rather than the first gear ratio.

Herein, when the gear ratio of the first input shaft 6 to the output shaft 31 is made to be the third gear ratio, as shown in FIG. 16, the hub 21 is coupled with the gear 17 so that the gear 17 may be coupled with the output shaft. Upon completion of this engagement, the actuator 36 is controlled so that the pressure force of the clutch 4 may be released. Then, the gear shifting from the first gear to the third gear is completed. In the third gear driving state, the torque of the engine 1 is transmitted in a path composed of the output shaft 2, the clutch 5, the first input shaft 6, the gear 7, the gear 17, the hub 21, and the output shaft 31 in this describing order.

As set forth above, when the jumped gear shifting is caused, the first gear state is released so that the gear is in the neutral state. At this time, since the torque of the engine 1 is transmitted to the axle 33 by means of the clutch 4 and the gears 9 and 19, the lowered torque in the jumped gear shifting of the system may be corrected.

Figure 17:
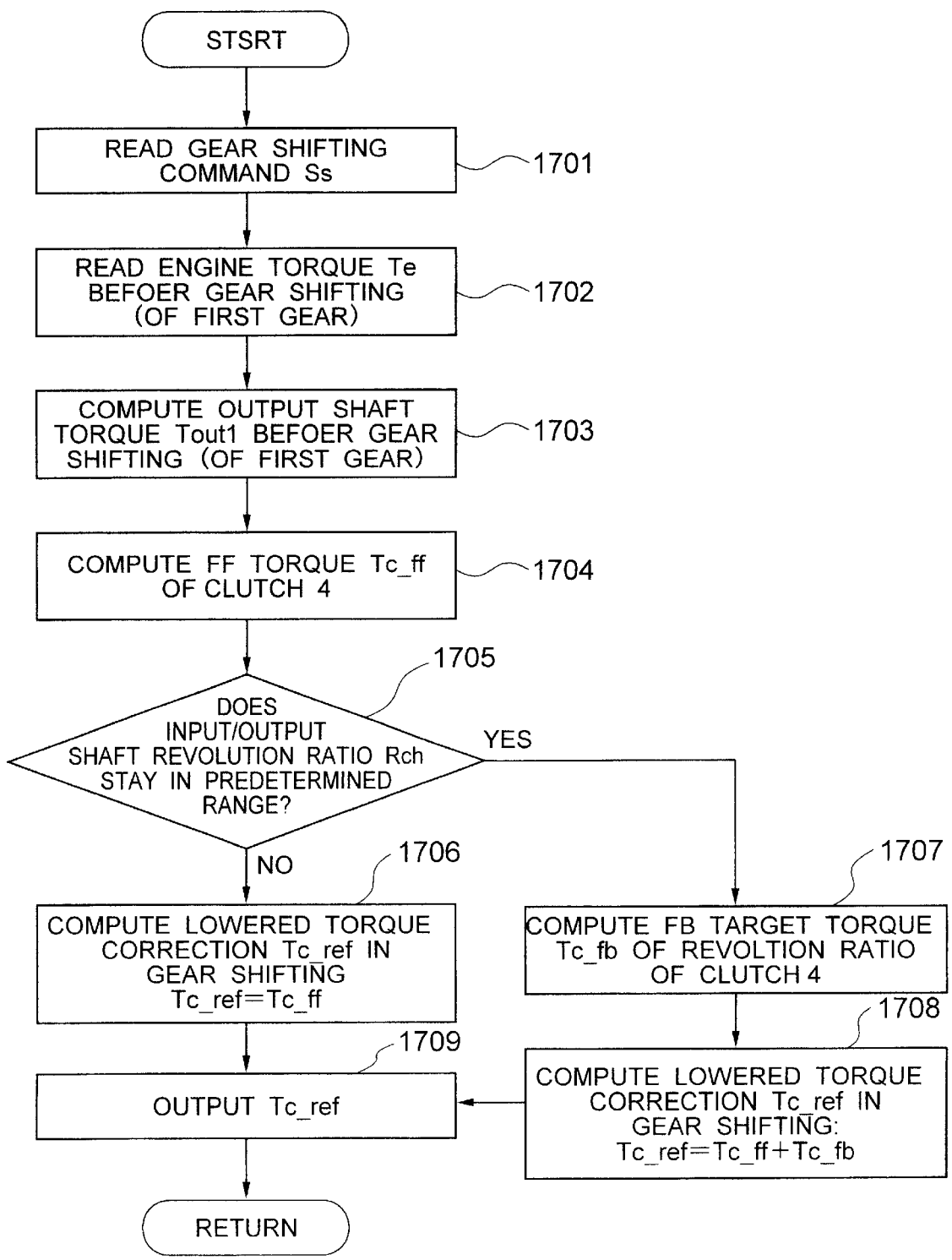
FIG. 17 is a flowchart showing a process to be executed in a lowered torque correcting unit 103 shown in FIG. 12.
Figure 18:
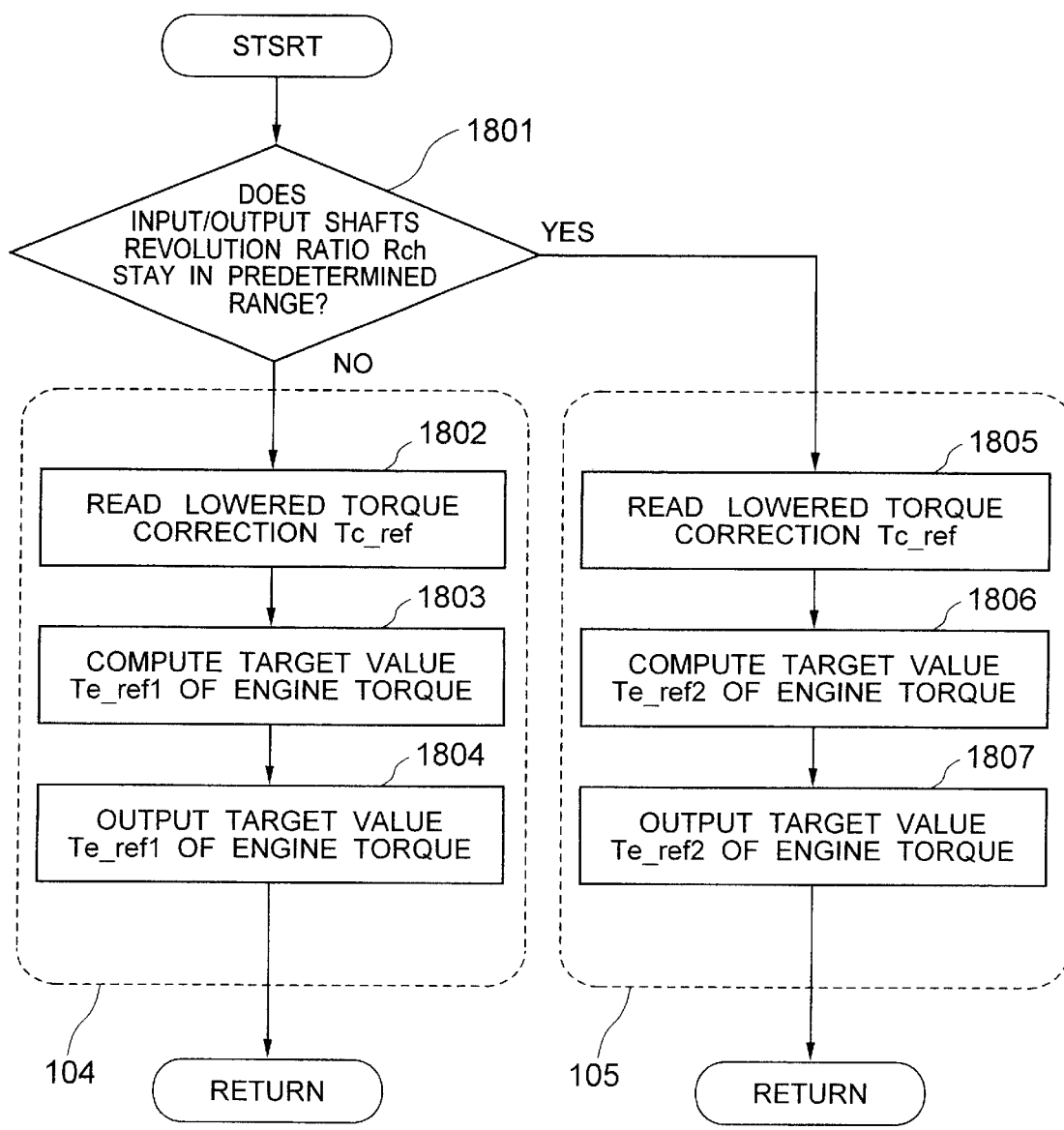
FIG. 18 is a flowchart showing a rotation control unit 104 and a torque adjusting unit 105 shown in FIG. 12.
Figure 19:
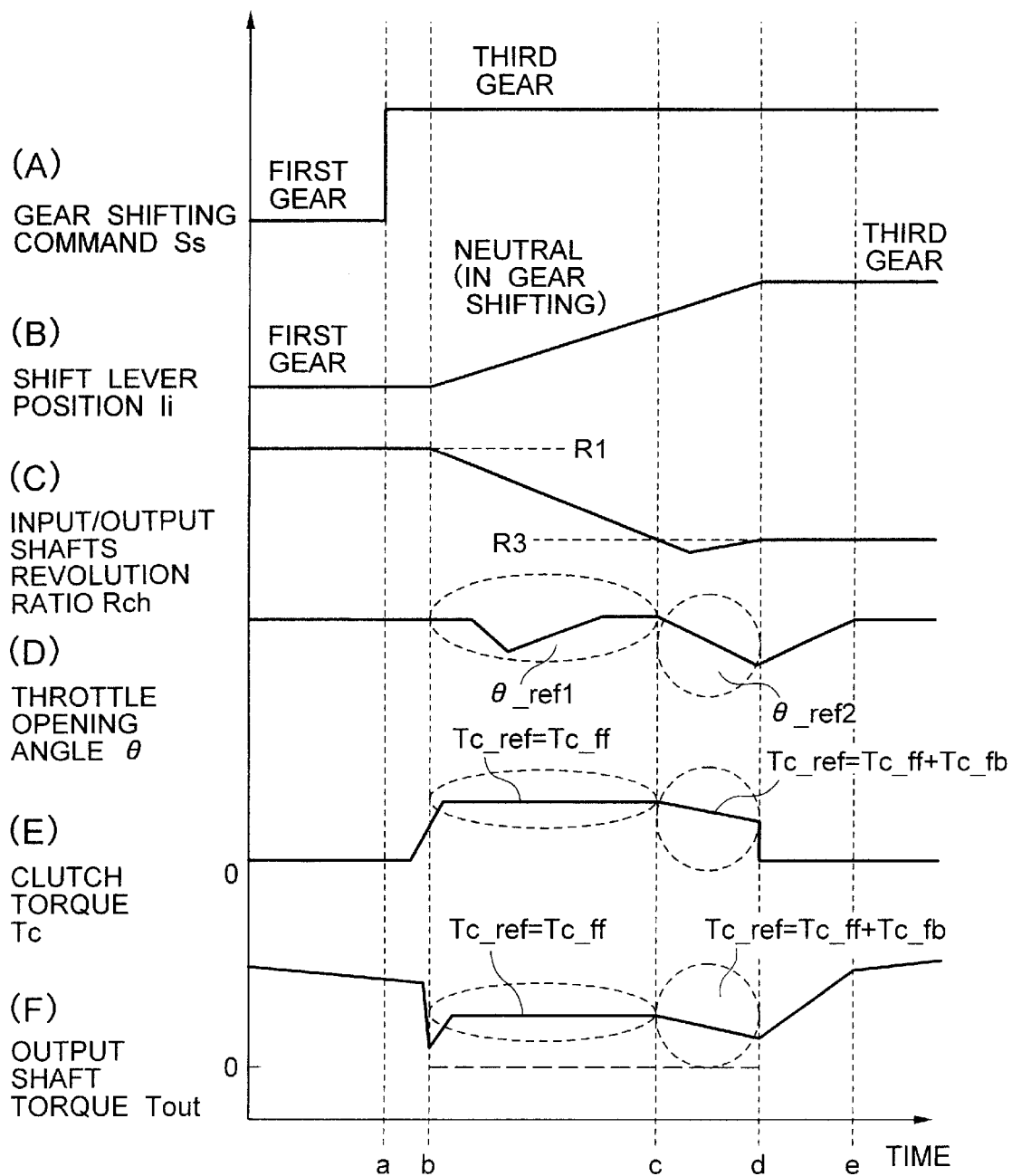
FIG. 19 is a time chart showing a control state in gear shifting in the embodiment shown in FIG. 12.

Then, with reference to FIGS. 17 to 19, the description will be oriented to the control method in gear shifting to be executed in the apparatus of controlling a vehicle according to this embodiment.

At first, the description will be oriented to the control process content to be executed by the lowered torque correcting unit 103.

FIG. 17 is a flowchart showing a control process to be executed by the lowered torque correcting unit 103.

In step 1701, an operation is executed to read the gear shifting command Ss outputted from the gear shifting command generating unit 102. In step 1702, an operation is executed to read torque Te1 of the engine 1 before the gear shifting (the first gear) transmitted from the control device 41 through the LAN. In step 1703, an operation is executed to compute torque out1 of the output shaft 31 before the gear shifting (first gear) on the basis of the torque Te1 of the engine before the gear shifting, the torque having been read in the step 1702.

In step 1704, an operation is executed to compute the FF (Feed Forward) target torque Tc_ff of the clutch 4, based on the torque out1 of the output shaft 31 computed in the step 1703. Assuming that the first gear ratio is R1, the third gear ratio is R3, the engine speed before the gear shifting is Ne1, and the engine speed after the gear shifting (the third gear) is Ne3, the engine speed Ne3 after the gear shifting may be presumed as Ne3 Ne1*(R3/R1). Then, the engine torque after the gear shifting can be derived according to the presumed engine speed Ne3 and the throttle opening angle. Hence, the torque Tout3 of the output shaft after the gear shifting can be presumed. According to this presumed Tout3, the FF target torque Tc_ff of the clutch 4 can be computed.

In step 1705, it is determined whether or not the revolution speed ratio Rch of the I/O shafts derived from the engine speed Ne (the revolution speed Nin1 of the first input shaft) and the revolution speed No of the output shaft stays in a predetermined range. If not, the process goes to a step 1706, while if yes, the process goes to a step 1707.

In the step 1706, during the gear shifting, if the revolution speed ratio Rch of the I/O shafts does not stay in the predetermined range, the lowered torque correction Tc_ref in the gear shifting is computed as Tc_ref=Tc_ff. In the step 1707, during the gear shifting, if the ratio Rch stays in the predetermined range, an operation is executed to feed back a deviation between a target revolution speed ratio corresponding to the third gear ratio and the revolution speed ratio Rch of the I/O shafts and then compute the target torque Tc_fb of the revolution speed ratio FB (Feed Back) of the clutch 4 based on the deviation. At a time, it is possible to compute the target engine speed (the revolution speed of the first input shaft), feed back the engine speed Ne, and then compute the FB target torque Tc_fb of the revolution ratio of the clutch 4.

In the step 1708, the lowered torque correction Tc_ref in the gear shifting is computed as Tc_ref=Tc_FF+Tc_fb. In step 1709, the lowered torque correction Tc_ref in the gear shifting derived in the steps 1706 and 1708 is outputted as the target torque of the clutch 4. The outputted lowered torque correction Tc_ref is transmitted to the control device 43 through the LAN.

The control device 43 is served to hydraulically drive the actuators 36 to 40. It is served to adjust the pressure force of the clutch for correcting the lowered value of the torque in the gear shifting by controlling the actuator 36, based on the value of Tc_ref.

As set forth above, the lowered torque correcting unit 103 is served to correct the lowered value of the torque of the output shaft 31 in the gear shifting and then improve the gear shifting performance.

In turn, the description will be oriented to the control process content in the revolution speed control unit 104 and the torque adjusting unit 105.

FIG. 18 is a flowchart showing a control process to be executed by the revolution speed control unit 104 and the torque adjusting unit 105.

In step 1801, it is determined whether or not the revolution speed ratio Rch of the I/O shafts derived on the engine speed Ne (the revolution speed Nin1 of the first input shaft) and the revolution speed No of the output shaft stays in the predetermined range. If not, the process goes to a step 1802 in which the control process is executed by the revolution speed control unit 104, while if yes, the process goes to a step 1805 in which the control process is executed by the torque adjusting unit 105.

At first, the description will be oriented to the control process content of the revolution speed control unit 104 to be executed in the steps 1802 to 1804. In the step 1802, an operation is executed to read the lowered torque correction Tc_ref derived by Tc_ref=Tc_ff. In the step 1803, an operation is executed to compute the target torque Tc_ref1 of the engine 1 that reaches such an engine speed Ne as realizing the predetermined revolution speed ratio Rch of the I/O shafts, based on the lowered torque correction Tc_ref read in the step 1802.

In the step 1804, an operation is executed to output the target torque Te_ref1 of this engine 1 derived in the step 1803. The outputted target torque Te_ref1 is transmitted to the control device 41 through the LAN.

The control device 41 is served to control the electronic control throttle 35 so that the engine 1 may reach the target torque Te_ref1.

Further, in the revolution speed control unit 104, in order to achieve the target torque Te_ref1 of the engine 1, it may be possible to control the air/fuel ratio of the engine 1 or control an ignition timing.

As described above, by controlling the engine speed Ne (the revolution speed Nin1 of the first input shaft 6) in the gear shifting by means of the revolution speed control unit 104, it is possible to couple the dog clutch to the third gear and suppress the inertia torque in coupling with the third gear, thereby improving the gear shifting performance.

In turn, the description will be oriented to the control process content of the torque adjusting unit 105 to be executed in the steps 1805 to 1807. In the step 1805, an operation is executed to read the lowered torque correction Tc_ref derived by Tc_ref=Tc_ff+Tc_fb. In the step 1806, an operation is executed to compute such a target torque Te_ref2 of the engine 1 as reducing a deviation between the torque of the output shaft after the gear shifting and the lowered torque correction Tc_ref, based on the lowered torque correction Tc_ref read in the step 1805.

In the step 1807, an operation is executed to output the target torque Te_ref2 of the engine 1 derived in the step 1806. The outputted target torque Te_ref2 of the engine 1 is transmitted to the control device 41 through the LAN.

The control device 41 is served to control the electronic control throttle 35 so that the engine 1 may reach the target torque Te_ref2.

Further, in the torque adjusting unit 105, in order to achieve the target torque Te_ref2 of the engine 1, it may be possible to control an air/fuel ratio of the engine 1 or control an ignition timing.

As set forth above, in the torque adjusting unit 105, by controlling the torque of the first input shaft 6 at the termination of the gear shifting, it is possible to reduce a deviation between the lowered torque correction in the gear shifting and the torque of the output shaft 31 after the gear shifting, thereby reducing the torque abrupt change and improving the gear shifting performance.

Then, the operation in the gear shifting will be described below.

FIG. 19 is a time chart showing the control state in the gear shifting. In FIG. 19, (A) indicates a gear shifting command Ss. (B) indicates a shift lever position Ii corresponding to the dog clutch position. (C) indicates the revolution speed ratio Rch of the I/O shafts. (D) indicates a throttle opening angle θ. (E) indicates a torque Tc of the clutch 4. (F) indicates a torque Tout of the output shaft 31. In addition, an axis of abscissa denotes a time.

As indicated in (A), the gear shifting is started when the gear shifting command Ss to the third gear state is outputted at the point a when a vehicle is running in the first gear state. As indicated in (E), the torque Tc of the clutch 4 is gradually increased.

With increase of the torque Tc of the clutch 4, as indicated in (F), the torque Tout of the output shaft 31 is gradually decreased, and at the point b, the dog clutch coupled with the first gear side is releasable. The torque transmitted through the gears 9 and 19 serves to reduce the torque transmitted through the gears 8 and 19 into such a value as releasing the dog clutch.

When the dog clutch is made releasable, by controlling the actuator 39, the dog clutch coupled to the first gear side is released. As indicated in (B), the shift lever position Ii enters into a neutral state (under the gear shifting) and then the actual gear shift is started.

When the shift lever position Ii is in the neutral state, as indicated in (E), the control of the clutch 4 is started for correcting the lowered value of the torque in the gear shifting. Then, by controlling the actuator 36 according to the target torque Tc_ref=Tc_ff of the clutch 4 outputted from the lowered torque correcting unit 103, as indicated in (F), the lowered value of the torque of the output shaft 31 in the gear shifting may be corrected.

At a time, since the torque transmitted through the clutch 4 is made to be the torque of the output shaft 31, for reducing the abnormal feeling a passenger in a vehicle feels, it is preferable to provide the target torque Tc_ref of the clutch 4 with a smooth characteristic. Further, during the gear shifting, it is necessary to swiftly and smoothly control the revolution speed ratio Rch of the I/O shafts to be the third gear ratio R3.

Hence, for achieving the target torque Te_ref1 of the engine 1 outputted by the revolution speed control unit 104, as indicated in (D), an operation is executed to control the throttle opening angle as θ=θ_ref1 for adjusting the engine speed Ne and make the revolution speed ratio Rch of the I/O shafts closer to the third gear ratio.

By this control for the clutch 4 and the electronic control throttle 35, as indicated in (C), the revolution speed ratio Rch of the I/O shafts is made to be Rch=R3 at the point c. For engaging the dog clutch, it is preferable to increase the engine speed Ne (the revolution speed Nin1 of the first input shaft 6) and to suit the revolution speed ratio Rch of the I/O shafts to the third gear ratio R3. The reason is as follows. Since the revolution speed No of the output shaft 31 is increased by the lowered torque correction corrected during the gear shifting, if the engagement of the dog clutch as decreasing the revolution speed of the first input shaft 6 is made difficult because the torque interference takes place in the engaged portion of the dog clutch. Hence, the engagement of the dog clutch as increasing the revolution speed of the first input shaft 6 suppresses the torque interference more.

Since Rch<R3 at the point c, it is necessary to increase the revolution speed ratio Rch of the I/O shafts. Immediately before the engagement (between the points c and d), the control of the engine torque Te is slightly delayed in response. Hence, it is preferable to adjust the revolution speed ratio Rch of the I/O shafts by the torque of the clutch 4. Hence, in the interval between the points c and d, an operation is executed to add the revolution speed ratio FB target torque Tc_fb of the clutch 4 according to a deviation between the revolution speed ratio Rch of the I/O shafts and the third gear ratio R3 and then to set the target torque of the clutch 4 to Tc_ref=Tc_ff+Tc_fb.

As described above, only in the interval when the deviation between the revolution speed ratio Rch of the I/O shafts and the third gear ratio R3 is small, by feeding back the revolution speed ratio, it is possible to suppress the torque variation of the lowered torque correction in the gear shifting to a minimum and alleviate the abnormal feeling a passenger in a vehicle feels. By this revolution speed ratio FB control of the clutch 4, the revolution speed ratio Rch of the I/O shafts is made to be Rch R3 as it is increasing, so that the dog clutch may be coupled with the third gear.

When the dog clutch is to be coupled with the third gear state, by controlling the actuator 39, the dog clutch is coupled with the third gear. At this time, by reducing a deviation between the lowered torque correction Tc_ref=Tc_ff+Tc_fb in the gear shifting and the torque of the output shaft 31 after the gear shifting (after linked with the third gear), it is preferable to reduce the torque abrupt change of the output shaft 31 at the termination of the gear shifting.

The lowered torque correction in the gear shifting is determined by the torque Tc of the clutch 4. The torque of the output shaft 31 after the gear shifting is determined by the torque Te of the engine 1 and the three gear ratio R3. Hence, between the points c and d, for achieving the target torque Te_ref2 of the engine 1, the throttle opening angle is controlled to be θ=θ_ref2. During the gear shifting, the clutch 4 is made slipping. Hence, if the torque Te of the engine 1 is greater than a predetermined value, the lowered torque correction in the gear shifting is determined by the torque Tc of the clutch 4. Hence, the torque adjusting control at the termination of the gear shifting can be executed independently of the lowered torque correction control in the gear shifting.

At the point d, the dog clutch is coupled with the third gear and the actual gear shifting is completed. Then, the throttle angle be θ is gradually returned to the opening angle before the gear shifting. At the point e, the gear shifting control is terminated.

As set forth above, according to this embodiment, in the gear shifting, it is possible to derive the lowered torque correction of the output shaft 31 in the gear shifting, control the revolution speed of the first input shaft 6 on the basis of the lowered torque correction, and adjust the torque of the first input shaft 6 at the termination of the gear shifting, thereby suppressing the torque variation of the output shaft 31.

In turn, the description will be oriented to the arrangement of the apparatus of controlling a vehicle according to another embodiment of the invention with reference to FIGS. 20 to 23.

Figure 20:
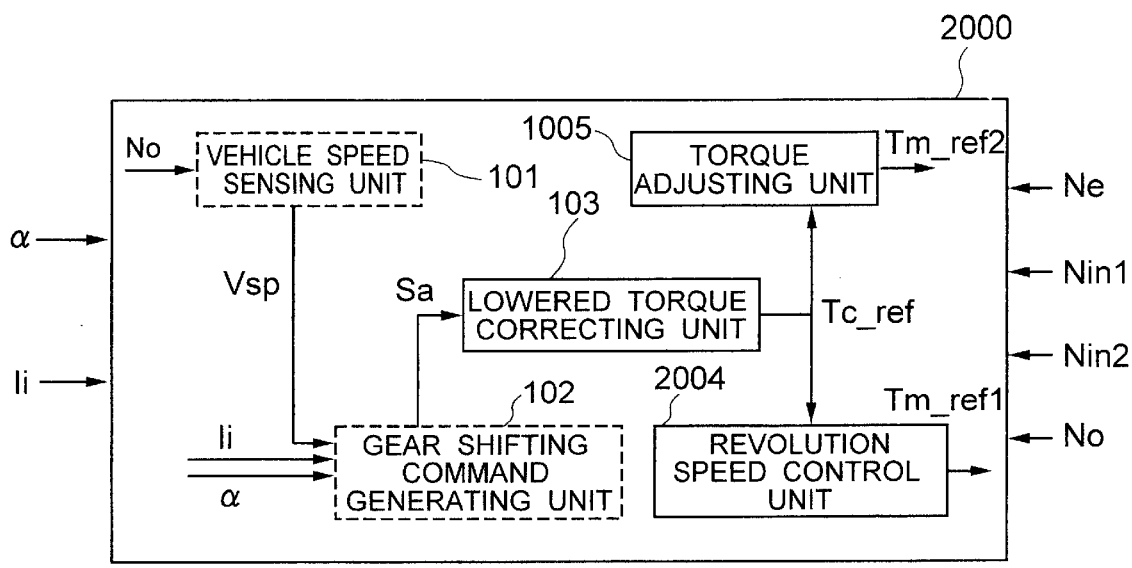
FIG. 20 is a block diagram showing an apparatus of controlling a vehicle according to another embodiment of the present invention.

FIG. 20 is a block diagram showing the control apparatus according to this embodiment. The overall system arrangement in the vehicle is likewise to that of the embodiment shown in FIGS. 12 and 13 and thus is not described herein. The same components as those of the embodiment shown in FIGS. 12 and 13 have the same reference numbers.

The control apparatus 2000 includes a vehicle speed sensing unit 101, a gear shifting command generating unit 102, a lowered torque correcting unit 103, a revolution speed control unit 2004, and a torque adjusting unit 2005. The control apparatus 2000 can be realized by the same computer as the control apparatus 100.

Figure 13:
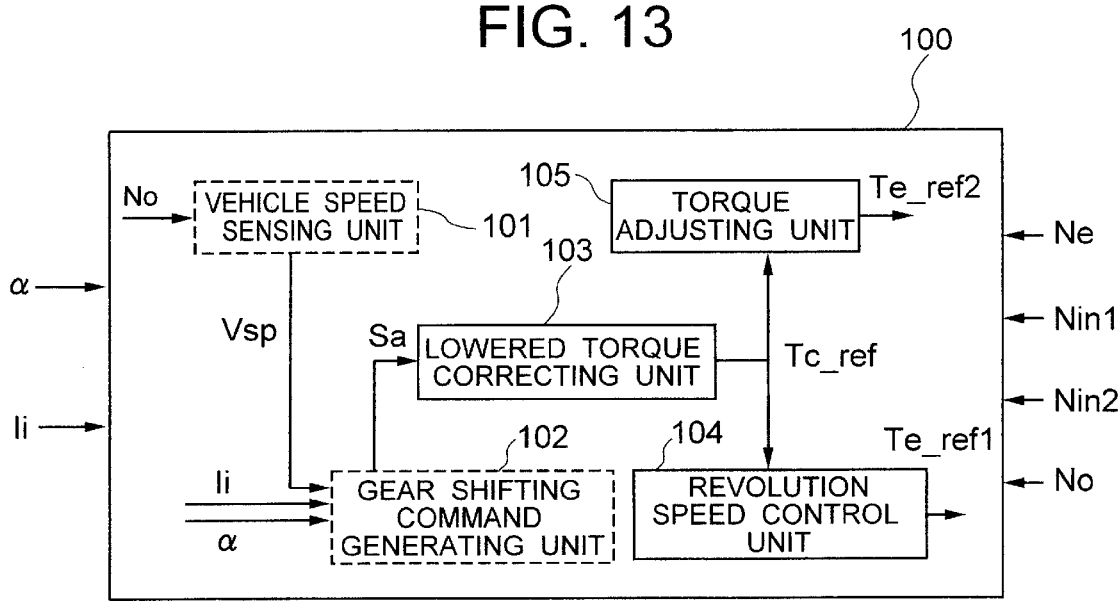
FIG. 13 is a block diagram showing a control apparatus 100 in the embodiment shown in FIG. 12.

The control process contents to be executed by the gear shifting sensing unit 101 and the gear shifting command generating unit 102 are likewise to those of the embodiment shown in FIG. 13 and thus are not described herein.

Figure 21:
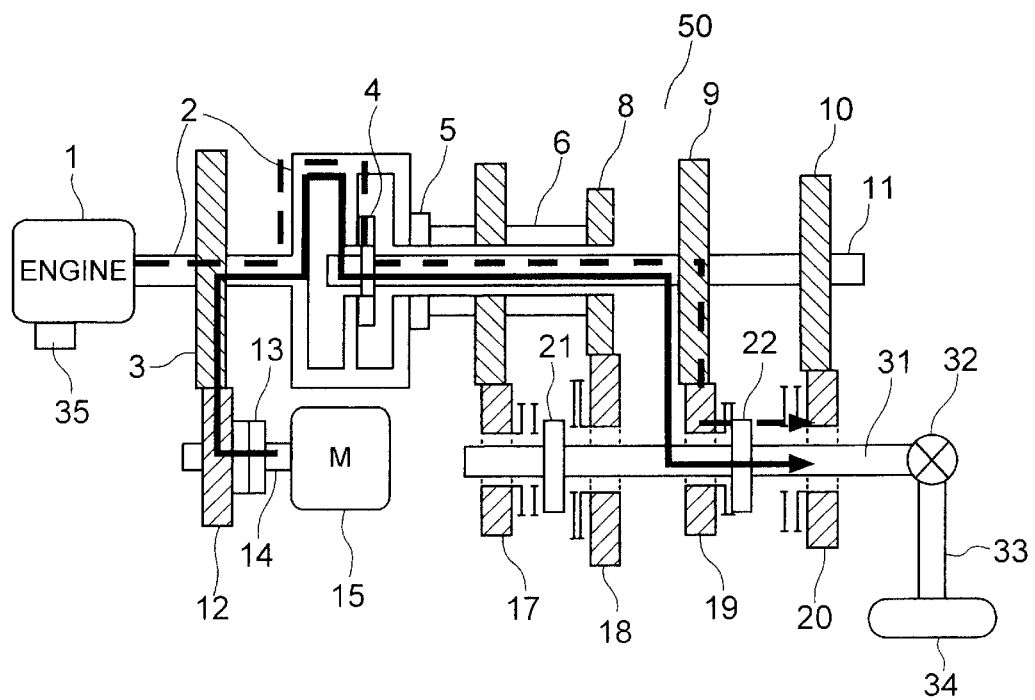
FIG. 21 is an explanatory view showing a first to a third gear states in the embodiment shown in FIG. 20.

Herein, the description will be oriented to the control of the clutch 4 and the motor 15 in shifting the first gear driving state to the third gear driving state with reference to FIG. 21.

When the gear shifting command Ss is outputted from the gear shifting command generating unit 102, as shown in FIG. 21, the dog clutch (hub 21) is released and then the engagement of the gear 18 with the output shaft 31 is released. At this time, the clutch 13 is being engaged by the control of the actuator 38. The torque of the motor 15 is transmitted in a path composed of the output shaft 14 of the motor 15, the clutch 13, the gear 12 and the gear 3 in the describing order. This makes it possible to control the engine speed Ne (the revolution speed of the first input shaft 6) and adjust the torque of the first input shaft 6.

During the gear shifting, when the clutch 4 is pressed onto the output shaft of the engine 1 by controlling the actuator 36, the torque of the engine 1 is transmitted to the output shaft 31 through the gears 9 and 19. The pressure force of this clutch 4 serves to transmit the torque of the engine 1 to the axle 33 so that this torque drives the vehicle. Since the use of the gears 9 and 19 makes the gear ratio smaller, the load burdened on the engine 1 becomes larger accordingly. Hence, the engine speed is made lower, so that the gear ratio of the output shaft 31 to the first input shaft 6 is made closer to the third gear ratio (smaller) rather than the first gear ratio.

At this time, the torque of the engine 1 is transmitted in a path composed of the output shaft 2 of the engine 1, the clutch 4, the gear 9, the gear 19, the hub 22, and the output shaft 31 in this describing order. Herein, when the gear ratio of the first input shaft 6 to the output shaft 31 is changed into the third gear ratio, the dog clutch (hub 21) is coupled with the gear 17 and then the gear 17 is coupled with the output shaft 31. At a time when the dog clutch is coupled with the third gear, the actuator 36 is controlled to release the pressure force of the clutch 4 and then complete the gear shifting.

As set forth above, during the gear shifting, the dog clutch is released from the first gear and enters into the neutral state. The torque of the engine 1 and the motor 15 is transmitted to the axle 33 through the output shaft 31 by means of the clutch 4 and the gears 9 and 19. Hence. the lowered value of the torque in the gear shifting may be corrected.

Figure 22:
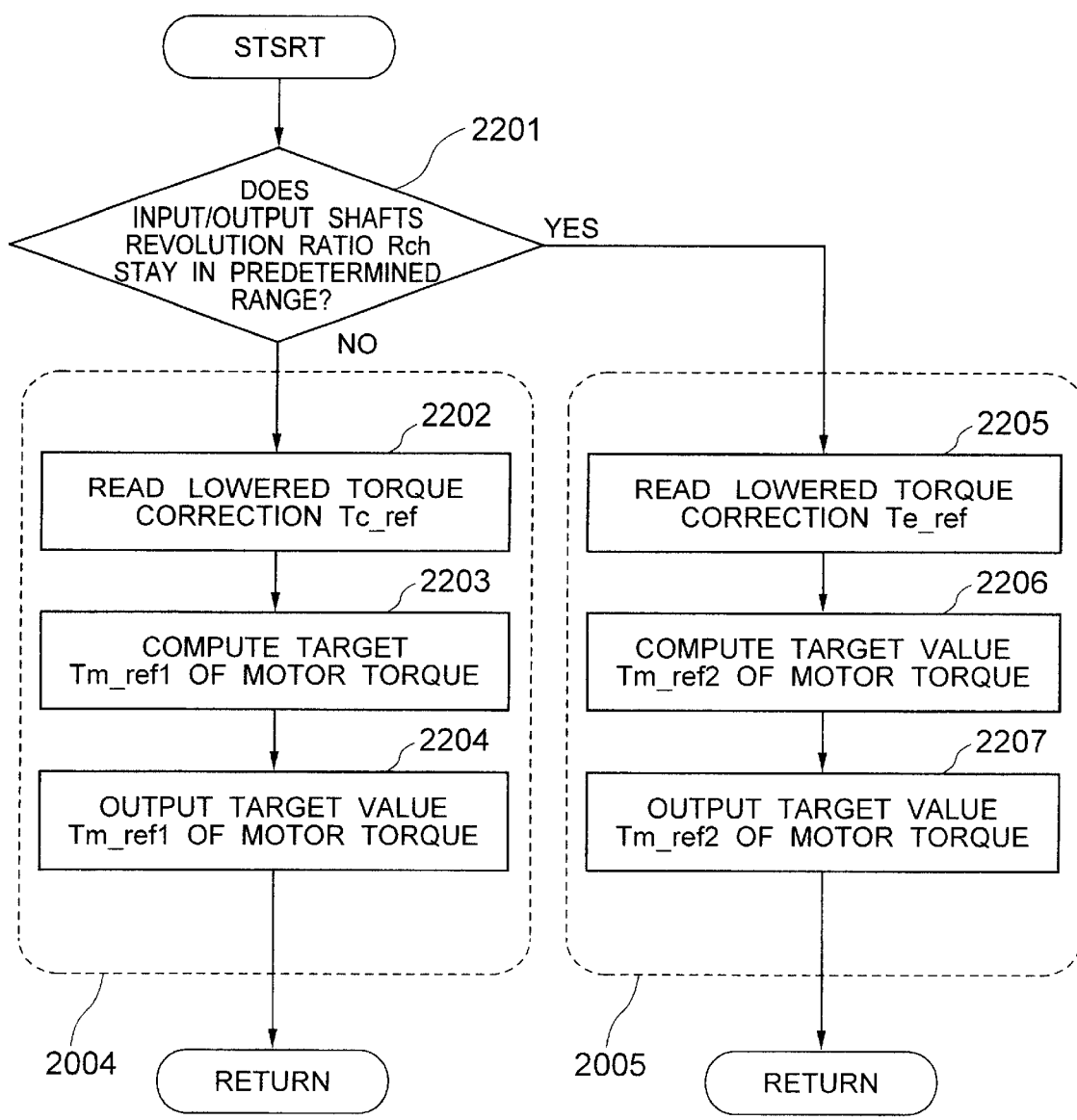
FIG. 22 is a flowchart showing a processing content of a revolution speed control unit 2004 and a torque adjusting unit 2005 shown in FIG. 20.
Figure 23:
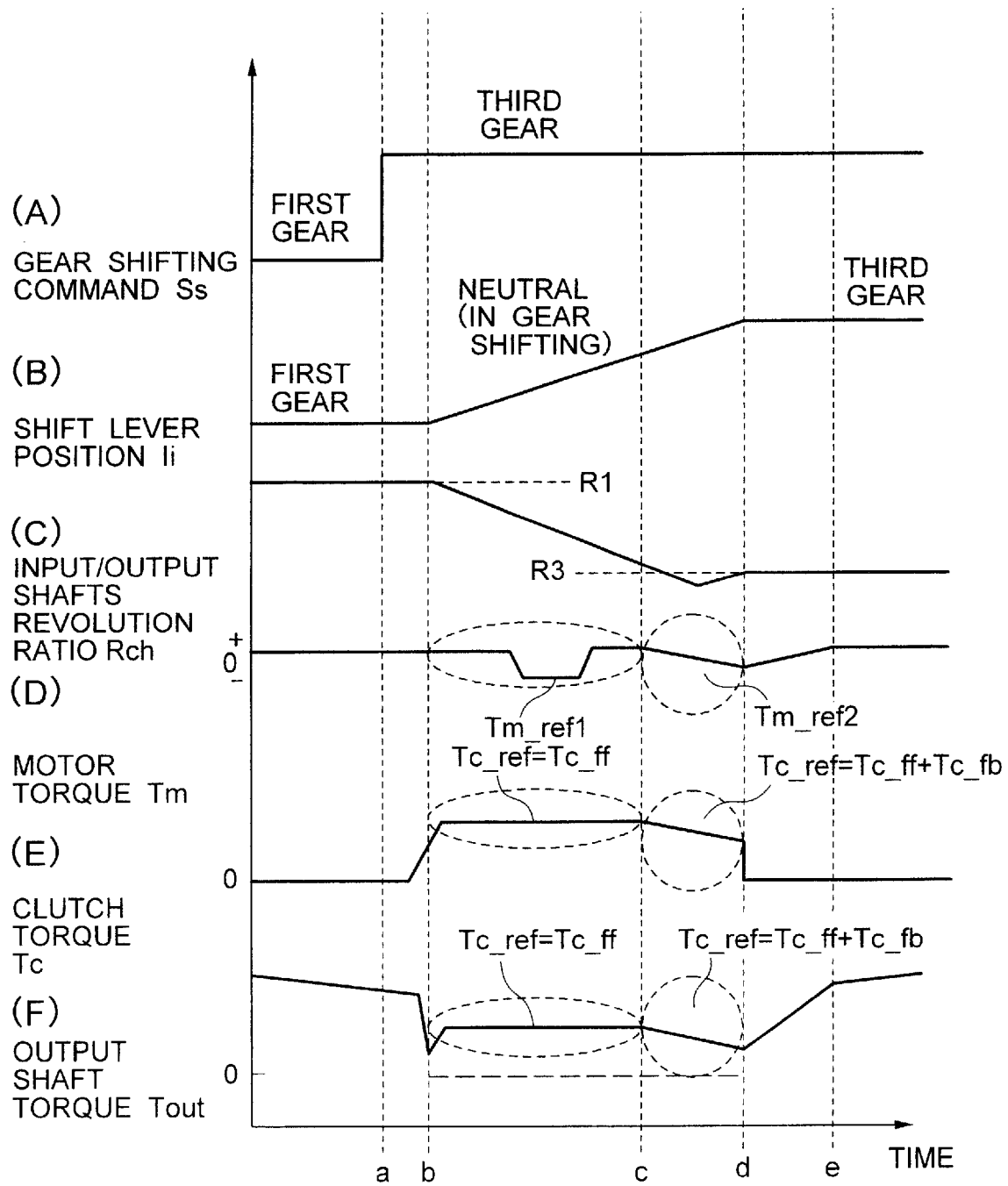
FIG. 23 is a time chart showing a control state in gear shifting in the embodiment shown in FIG. 20.

Herein, the description will be oriented to the control method in the gear shifting to be executed by the apparatus of controlling a vehicle according to this embodiment with reference to FIGS. 22 and 23. In addition, the control process content in the lowered torque correcting unit 103 is likewise to that described with reference to FIG. 17 and thus is not described herein.

At first, the description will be oriented to the control process content in the revolution speed control unit 2004 and the torque adjusting unit 2005 with reference to FIG. 22. FIG. 22 is a flowchart showing a control process in the revolution speed control unit 2201 and the torque adjusting unit 2202.

In step 2201, it is determined whether or not the revolution speed ratio Rch of the I/O shafts derived on the engine speed Ne (the revolution speed Nin1 of the first input shaft) and the revolution speed No of the output shaft stays in the predetermined range. If not, the process goes to a step 2202 in which the control process is executed by the revolution speed control unit 2004, while if yes, the process goes to a step 2205 in which the process is executed by the torque adjusting unit 2005.

At first, the description will be oriented to the control process content of the revolution speed control unit 2004 to be executed in steps 2202 to 2204.

In the step 2202, an operation is executed to ead the lowered torque correction Tc_ref derived by the expression of Tc_ref=Tc_ff. In the step 2203, an operation is executed to compute such a target torque Tm_ref1 of the motor 15 as achieving the engine speed Ne for realizing the predetermined revolution speed Rch of the I/O shafts, based on the lowered torque correction Tc_ref read in the step 2202. In the step 2204, an operation is executed to output the target torque Tm_ref1 of the motor 15 derived in the step 2203. The target torque Tm_ref1 of the motor 15 is transmitted to the control device 42 through the LAN. The control device 42 is served to control the motor 15 and the battery 16 so that the motor 15 reaches the target torque Tm_ref1.

As set forth above, in the revolution speed control unit 2004, this embodiment makes it possible to control the revolution speed of the first input shaft 6 in the gear shifting and couple the dog clutch to the third gear, thereby suppressing the inertia torque appearing in engagement of the dog clutch to the third gear and improving the gear shifting performance.

In turn, the description will be oriented to the control process of the torque adjusting unit 2005 to be executed in steps 2205 to 2207.

In the step 2205, an operation is executed to read the lowered torque correction Tc_ref derived by Tc_ref=Tc_ff+Tc_fb. In the step 2206, an operation is executed to compute the target torque Tm_ref2 of the motor 15 for reducing a deviation between the torque of the output shaft after the gear shifting and the lowered torque correction Tc_ref, based on the lowered torque correction Tc_ref read in the step 2205.

In the step 2207, an operation is executed to output the target torque Tm_ref2 of the motor 15 derived in the step 2206. The target torque Tm_ref2 of the motor 15 is transmitted to the control device 42 through the LAN.

The control device 42 serves to control the motor 15 and the battery 1 so that the motor 15 reaches the target toque Tm_ref2.

As set forth above, in the torque adjusting unit 2005, it is possible to control the, torque of the first input shaft 6 at the termination of the gear shifting for reducing a deviation between the lowered torque correction in the gear shifting and the torque of the output shaft 31 after the gear shifting, thereby lessening the torque abrupt change and improving the gear shifting performance.

In turn, the description will be oriented to the operation in the gear shifting.

FIG. 23 is a time chart showing the control state in the gear shifting, in which figure (A) indicates a gear shifting command Ss, (B) indicates a shift lever position Ii corresponding to the dog clutch position, (C) indicates the revolution speed ratio Rch of the I/O shafts, (D) indicates the torque Tm of the motor 15, (E) indicates the torque Tc of the clutch 4, (F) indicates the torque Tout of the output shaft 31, and an axis of abscissa denotes a time.

As indicated in (A), when the command Ss of gear shifting to the third gear is outputted at the point a while a vehicle is running at the first gear, the gear shifting control is started, when as indicated in (E), the torque Tc of the clutch 4 is gradually increased.

With increase of the torque Tc of the clutch 4, as indicated in (F), the torque Tout of the output shaft 31 is gradually decreased. At the point b, the dog clutch coupled to the first gear side enters into the releasable state. This is because the torque transmitted through the gears 9 and 19 serves to reduce the torque transmitted through the gears 8 and 18 into such a value as releasing the dog clutch.

When the dog clutch may be released, the actuator 39 is controlled so that the (log clutch coupled to the first gear side may be released and as indicated in (B), the shift lever position Ii enters into the neutral position (gear shifting state) and then the actual gear shift is started.

When the shift lever position Ii enters into a neutral position, as indicated in (E), the control of the clutch 4 is started for correcting the lowered value of the torque in the gear shifting. By controlling the actuator 36 according to the target torque Tc_ref=Rc_ff of the clutch 4 outputted from the lowered torque correcting unit 103, as indicated in (F), the lowered value of the torque of the output shaft 31 can be corrected during the gear shifting.

At this time, the torque transmitted through the clutch 4 is made to be the torque of the output shaft 31. For reducing the abnormal feeding a passenger in a vehicle feels, therefore, it is preferable to provide the target torque Tc_ref of the clutch 4 with a smooth characteristic. Further, during the gear shifting, it is necessary to swiftly and smoothly control the revolution speed ratio Rch of the I/O shafts to be the third gear ratio R3.

As indicated in (D), therefore, the motor 15 and the battery 16 are controlled so that the target torque Tm_ref1 of the motor 15 outputted from the revolution speed control unit 2004 reaches the target torque Tm_ref1. This control makes it possible to adjust the engine speed Ne, thereby making the revolution speed ratio Rch of the I/O shafts closer to the third gear ratio R3.

As mentioned above, by controlling the clutch 4 and the motor 15, as indicated in ((C), the revolution speed ratio Rch of the I/O shafts is made to be Rch=R3 at the point c. For linking the dog clutch with the shaft, it is preferable to increase the engine speed Ne and suit the revolution speed ratio Rch of the I/O shafts to the third gear ratio R3. The revolution speed No of the output shaft 31 is increased by the lowered torque correction corrected during the gear shifting. Hence, to try to realize the engagement when the revolution speed of the first input shaft 6 is going to decrease, the torque interference takes place in the engaged portion of the dog clutch, so that the linkage is difficult to be done. It is thus better to link the dog clutch as increasing the revolution speed of the first input shaft 6, because the torque interference is reduced.

Since Rch<R3 at the point c or later, it is necessary to increase the revolution speed ratio Rch of the I/O shafts. Immediately before the linkage (between the points c and d), it is necessary to control both the torque and the revolution speed of the motor 15. If the selected motor 15 can execute either one of the torque control and the revolution speed control, it is necessary to adjust the revolution speed ratio Rch of the I/O shafts through the effect of the torque of the clutch 4. Hence, in the interval between the points c and d, it is necessary to add the FB target Tc_fb of the revolution speed ratio of the clutch 4 according to the deviation between the revolution speed ratio Rch of the I/O shafts and the third gear ratio R3 and to set the target torque of the clutch 4 to Tc_ref=Tc_ff+Tc_fb.

As described above, by feeding back the revolution speed ratio only in the interval when a small deviation takes place between the revolution speed ratio Rch of the I/O shafts and the third gear ratio R3, it is possible to suppress the torque variation of the lowered torque correction in the gear shifting to a minimum and thereby alleviate the abnormal feeding a passenger in a vehicle feels. The control for the revolution speed ratio FB of the clutch 4 makes it possible to realize Rch R3 with increase of the revolution speed ratio Rch of the I/O shafts, thereby forcing the dog clutch into the engage-able state to the third gear.

When the dog clutch enters into the engage-able state to the third gear, by controlling the actuator 39, the dog clutch is linked to the third gear. At this time, it is preferable to reduce a deviation between Tc_ref=Tc_ff+Tc_fb corresponding to the lowered torque correction in the gear shifting and the torque of the output shaft 31 after the gear shifting (coupled to the third gear), thereby lessening the torque abrupt change of the output shaft 31 at the termination of the gear shifting.

The lowered torque correction in the gear shifting is determined by the torque Tc of the clutch 4. The torque of the output shaft 31 after the gear shifting is determined by the torque Te of the engine 1, the torque Tm of the motor 15 and the third gear ratio R3. Between the points c and d, therefore, the motor 15 and the battery 16 are controlled so that the motor 15 reaches the target torque Tm_ref2. During the gear shifting, the clutch 4 is in the slipping state. Hence, if a sum of the torque Te of the engine 1 and the torque Tm of the motor 15 is greater than a predetermined value, the lowered torque correction in the gear shifting is determined by the torque Tc of the clutch 4. It means that the torque adjusting control at the termination of the gear shifting can be executed independently of the lowered torque correcting control in the gear shifting.

At the point d, the dog clutch is coupled to the third gear, and the actual gear shifting is completed. Upon completion of the gear shifting, the torque Tm of the motor 15 is gradually returned to zero, and at the point e, the control for the gear shifting is finished.

As described above, in the gear shifting, this embodiment makes it possible to derive the lowered torque correction of the output shaft 31 in the gear shifting, control the revolution speed of the input shaft 6 based on this lowered torque correction, and adjust the torque of the first input shaft 6 at the termination of the gear shifting, thereby suppressing the torque variation of the output shaft 31 and the gear shifting performance.

The present invention is not limited to the system arrangement according to the foregoing embodiments. The present invention may be applied to an apparatus of controlling a vehicle without motor 15. In addition, the clutch 4 or 5 may be any kind of friction clutch such as a dry type single plate clutch, a multiplate wet friction clutch or an electromagnetic clutch. The clutch 13 may be any kind of clutch such as a dry type single plate clutch, a multiplate wet clutch, an electromagnetic clutch or a dog clutch.

In turn, the description will be oriented to the arrangement of the apparatus of controlling a vehicle according to another embodiment of the invention.

Figure 24:
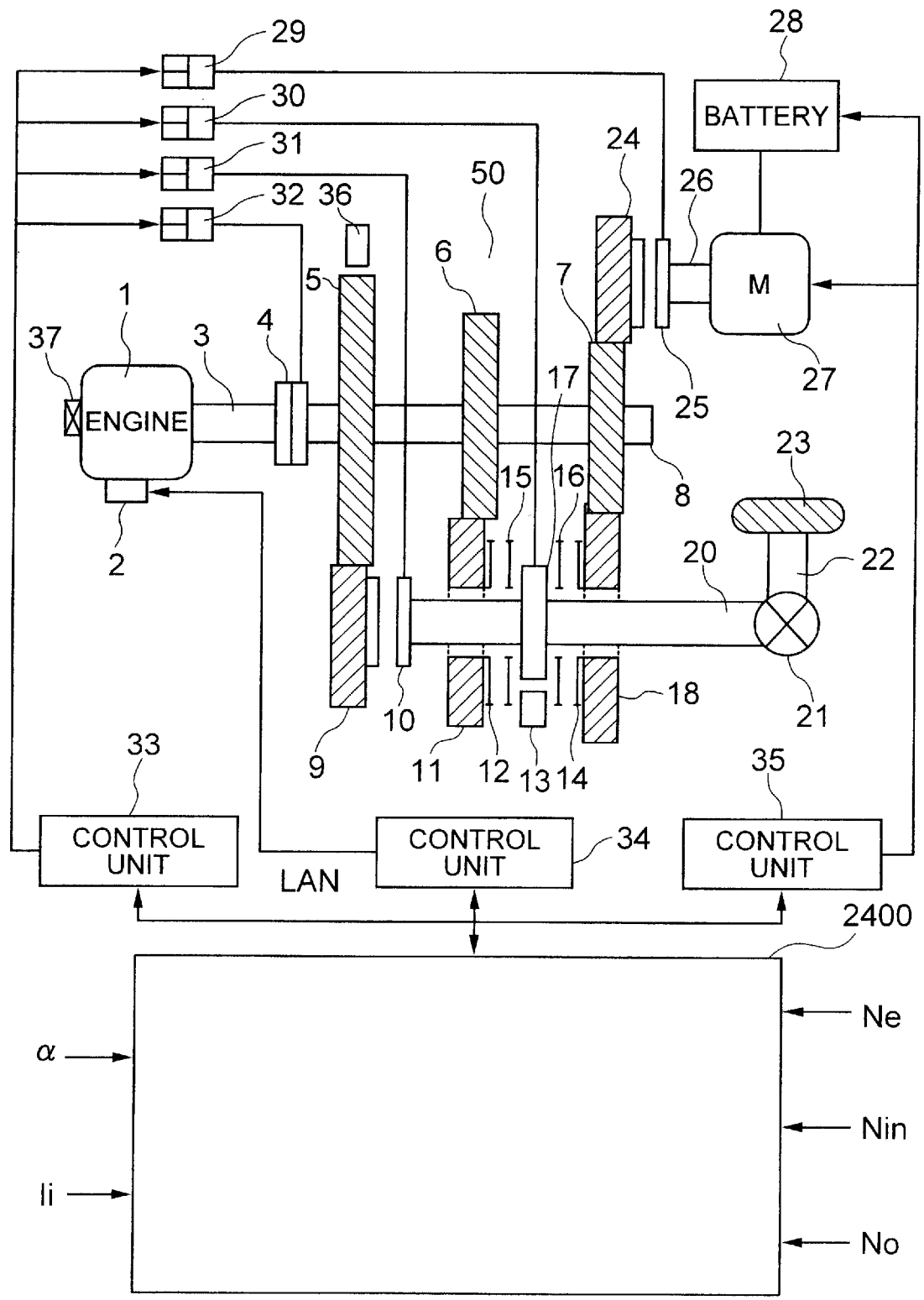
FIG. 24 is a block diagram showing an apparatus of controlling a vehicle according to another embodiment of the present invention.

FIG. 24 is a block diagram showing a control apparatus according to this embodiment. The overall system arrangement of the vehicle is likewise to that of the embodiment shown in FIG. 1 and thus is not described herein. The same components of this embodiment as those of the embodiment shown in FIG. 1 have the same reference numbers in the following description.

Figure 25:
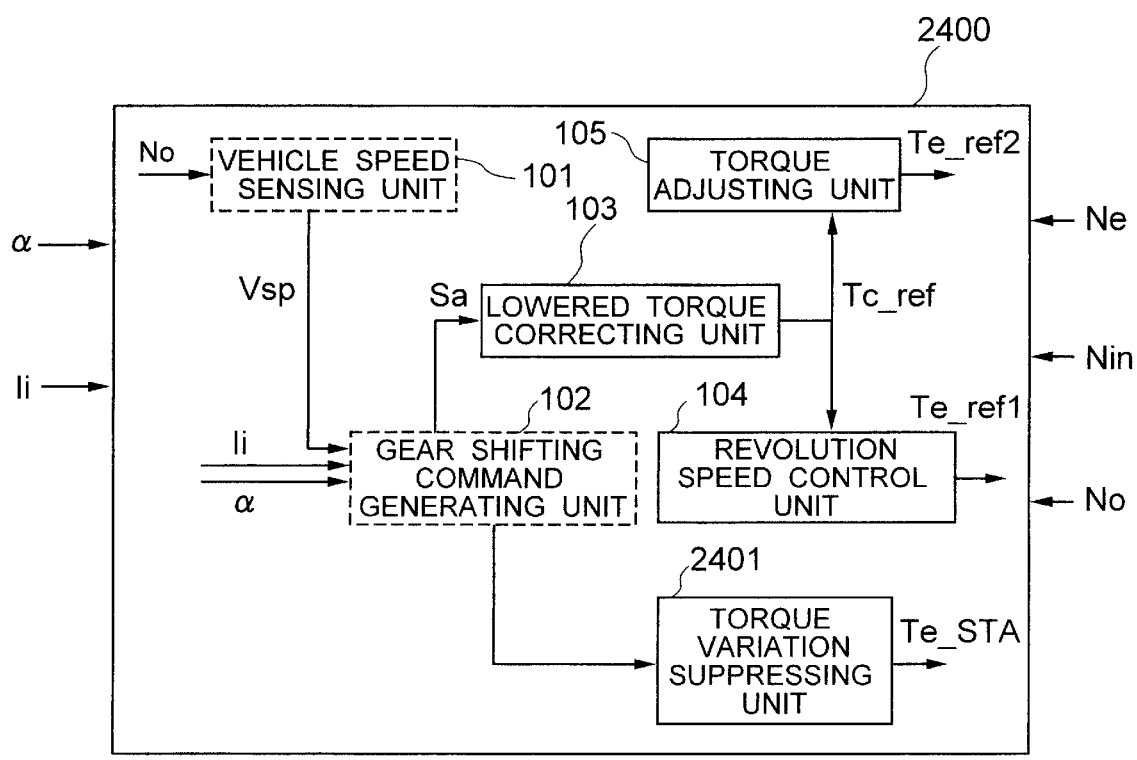
FIG. 25 is an explanatory view showing a control apparatus 2400 shown in FIG. 24.

Next, the description will be oriented to a control apparatus 2400 of controlling an engine 1, actuators 29, 30, 31 and 32, and a motor 27 with reference to FIG. 25.

The control apparatus 2400 is inputted with an accelerator pedal depress amount signal α, a shift lever position signal Ii, an engine speed Ne sensed by a sensor 37, a revolution speed signal Nin of the input shaft sensed by a sensor 36, and a revolution speed signal No of the output shaft sensed by a sensor 13. Then, this control apparatus 2400 is served to compute the torque Te of the engine 1 and transmit it to the control device 34 through the LAN served as communicating means. The control device 34 serves to compute such a throttle valve opening angle, a fuel amount and an ignition timing as achieving the received engine torque Te and then to control the corresponding actuators (for example, the electronic control throttle 2).

Further, the control apparatus 2400 serves to compute the torque and the revolution speed of the motor 27 and transmit them to the control device 35 through the LAN for controlling the motor thereon. The control device 35 serves to charge the battery with an electric power fed by the motor 27 and supply an electric power from the battery 28 for driving the motor 27. The control apparatus 2400 may be realized by the similar computer to that of the control apparatus 100.

The vehicle speed sensing unit 101, the gear shifting command generating unit 102, the lowered torque correcting unit 103, the revolution speed control unit 104, and the torque adjusting unit 105 are likewise to those of the control apparatus 100 shown in FIG. 1 and thus are not described herein.

Next, the description will be oriented to a torque variation suppressing unit 2401 located in the control apparatus 2400.

Figure 26:
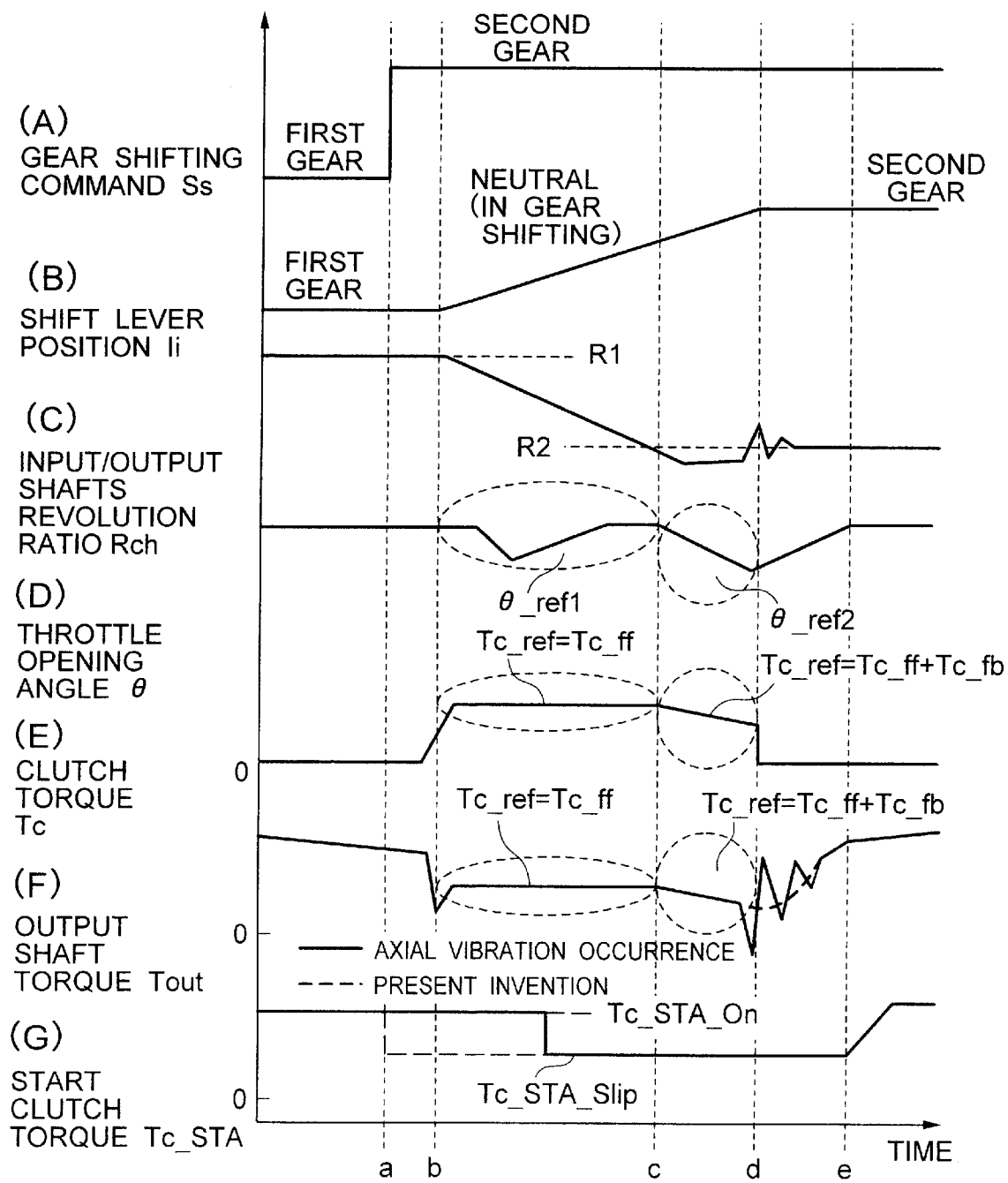
FIG. 26 is a time chart in gear shifting in the embodiment shown in FIG. 24.

FIG. 26 is a time chart showing a control state in the gear shifting, in which figure (A) indicates a gear shifting command Ss, (B) indicates a shift lever position Ii corresponding to the dog clutch position, (C) indicates a revolution speed ratio Rch of the I/O shafts, (D) indicates a throttle opening angle θ, (E) indicates a torque Tc of the clutch 10, (F) indicates a torque Tout of the output shaft 20, (G) indicates a torque Tc_STA of the advancing clutch 4, and an axis of abscissa denotes a time. The operation method in the gear shifting is likewise to the method shown in FIG. 7 and thus is not described herein.

When the dog clutch is engaged at the point d shown in FIG. 26, the adverse effect given by the control error and the variety of oil pressure brings about a vibrating torque variation (axial vibration) as indicated by a real line of (F) by means of the inertia torque of the engine 1 based on the deviation between Rch and R2 if the revolution speed ratio Rch of the I/O shafts shown in (C) is not suited to the second gear ratio R2. At this time, the clutch 4 enters into the engagement state. Assuming that the inertia of the engine 1 is Ie, the engine speed is Ne and the engine torque is Te, the torque Tin transmitted to the input shaft 8 is represented by the following expression (1).

$$Tin = Te - Ie(d/dt)Ne \quad (1)$$

If the revolution speed ratio Rch of the I/O shafts is not suited to the second gear ratio R2, the engine speed NE is abruptly changed. Hence, the inertia torque Ie (d/dt)Ne is increased and thus Tin is abruptly changed. As a result, the torque variation (axial vibration) caused by the inertia torque is generated. In order to avoid this shortcoming, an operation is executed to adjust the pressure force of the advancing clutch (clutch 4) as indicated in (G) of FIG. 26 on the basis of the gear shifting command Ss outputted from the gear shifting command generating unit 102, lowering the advancing clutch torque Tc_STA from Tc_STA_On (engage) to Tc_STA_Slip (slip). By slipping the clutch 4, the change of the engine speed Ne may be lowered when the dog clutch is engaged. This control for the clutch 4 is requested to be executed before the dog clutch is engaged in consideration of the response of the actuator 32 of the clutch 4. The control for the clutch 4 may be started from the point (a) as indicated in (G) of FIG. 26.

Figure 27:
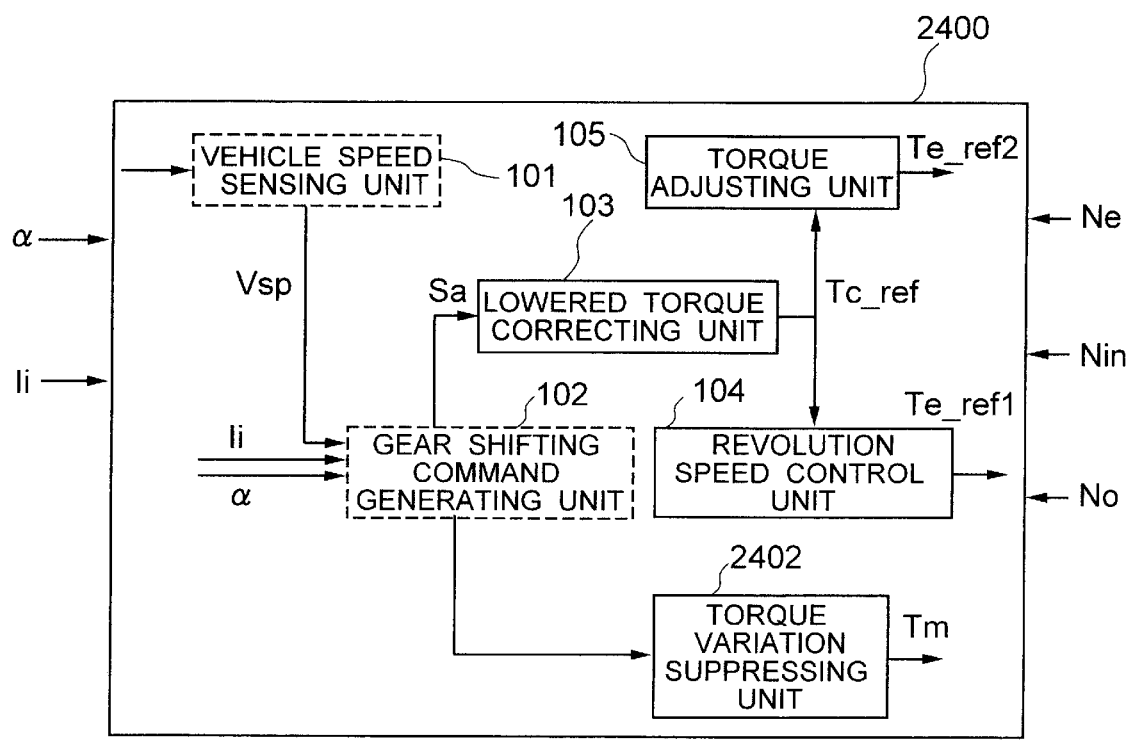
FIG. 27 is a block diagram showing the control apparatus 2400 provided with a motor 27 in the embodiment shown in FIG. 24.

In addition, the torque variation may be suppressed by the motor 27. FIG. 27 is a control block diagram showing the control apparatus 2400 in the case of using the motor 27.

The vehicle speed sensing unit 101, the gear shifting command generating unit 102, the lowered torque correcting unit 103, the revolution speed control unit 104, and the torque adjusting unit 105 are likewise to those of the control apparatus 100 shown in FIG. 1 and thus are not described herein.

Next, the description will be oriented to a torque variation suppressing unit 2402 located in the control apparatus 2400.

The torque variation suppressing unit 2402 is served to output a torque command value Tm of the motor 27. The engaging of the clutch 4 with the clutch 5 makes it possible to directly couple the output shaft 26 of the motor 27 with the output shaft 3 of the engine 1. thereby smoothly controlling the engine speed Ne through the use of the motor 27.

Figure 28:
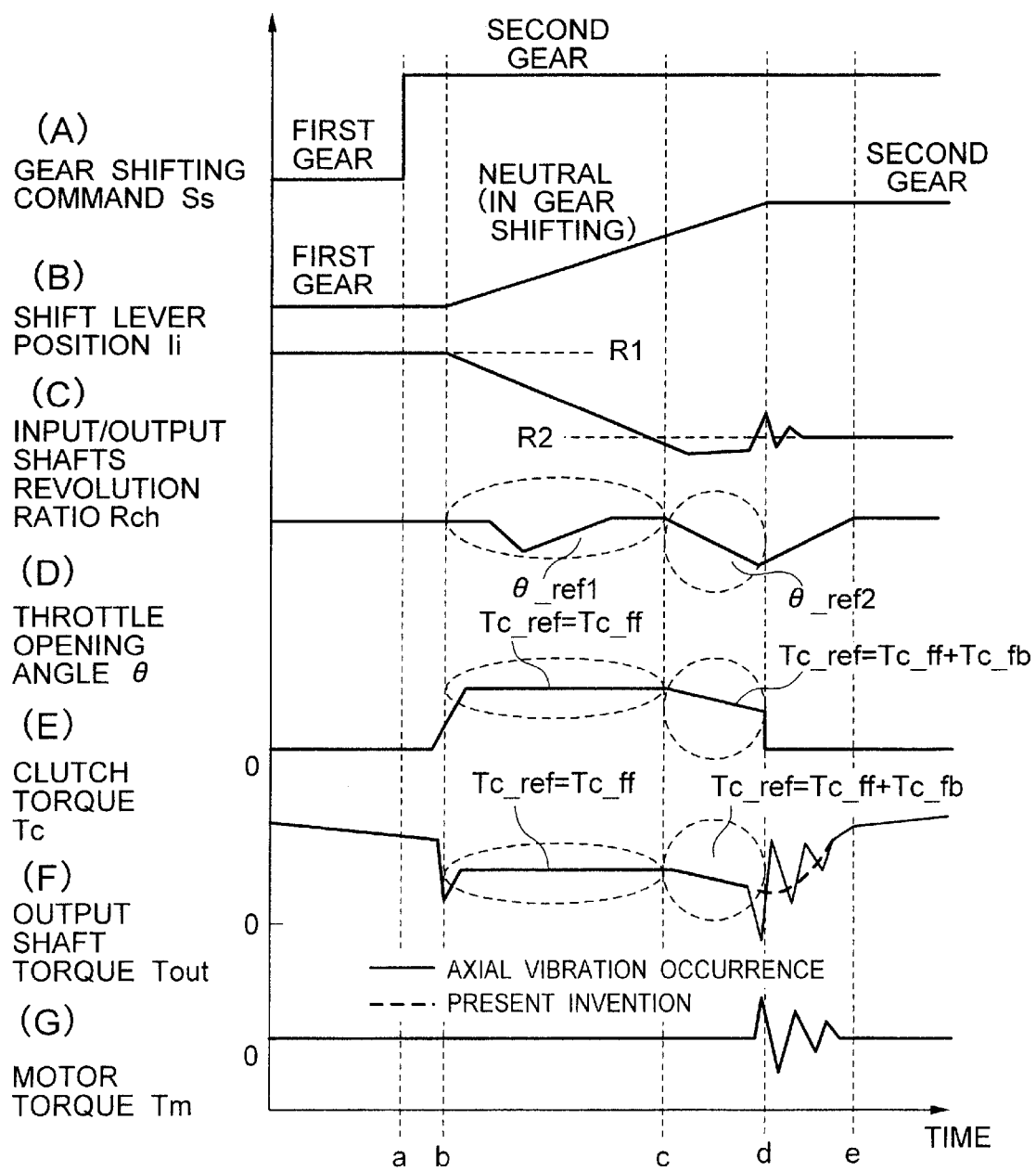
FIG. 28 is a time chart in gear shifting in the embodiment shown in FIG. 24.

FIG. 28 is a time chart showing a control state in the gear shifting. In FIG. 28, (A) to (F) are the same as the charts shown in FIG. 26 and thus are not described herein. (G) indicates a torque Tm of the motor 27. As indicated in (G), by controlling the motor torque Tm, it is possible to lessen the change of the engine speed Ne. It is preferable to start the control for the motor 27 immediately before the axial vibration takes place in consideration of the adverse effect on the torque Tout of the output shaft 20.

The foregoing control system makes it possible to lessen the change of the engine speed Ne and thus suppress the torque variation (axial vibration) as indicated in the dotted line of (F), thereby improving the gear shifting performance of a vehicle.

What is claimed is:

1. An apparatus for controlling a vehicle in which torque is transmitted from an engine to an input shaft through a friction clutch and a gear type transmission is mounted, said gear type transmission includes a plurality of gears and a plurality of dog clutches that allow torque to be transmitted from said input shaft to an output shaft, a torque transmission path is formed from said input shaft to said output shaft by engaging said gears with said dog clutches, and said torque transmission path from said input shaft to said output shaft is formed by controlling a torque correcting device when the engagement of said gears with said dog clutches is switched from a first engagement to a second engagement wherein said apparatus for controlling a vehicle is arranged to control an engaging force of said friction clutch so that the engaging force of said friction clutch is made lower than that of said first engagement when said torque transmission path from said input shaft to said output shaft is switched from the transmission path formed by controlling said torque correcting device into the transmission path formed by said second engagement.

2. An apparatus for controlling a vehicle in which torque is transmitted from an engine to an input shaft through a friction clutch and a gear type transmission is mounted, said gear drive transmission includes a plurality of gears and a plurality of dog clutches that allow torque to be transmitted from said input shaft to an output shaft, a torque transmission path is formed from said input shaft to said output shaft by engaging said gears with said dog clutches, and said torque transmission path from said input shaft to said output shaft is formed by controlling a torque correcting device when the engagement of said gears with said dog clutch is switched from a first engagement to a second engagement, wherein said apparatus for controlling a vehicle is arranged to make the engaging force of said friction clutch lower than the engaging force of said first engagement before switching said transmission path so as to suppress torque variation of said output shaft taking place when said torque transmission path from said input shaft to said output shaft is switched from the transmission path formed by controlling said torque correcting device into the transmission path formed by said second engagement.

3. An apparatus for controlling a vehicle as claimed in claim 1, wherein after the engagement of said gears with said dog clutches is switched into said second engagement, the lowered engaging force of said friction clutch is made higher.

4. An apparatus for controlling a vehicle as claimed in claim 1, wherein the torque lowered value of said output shaft taking place when the engagement of said gears with said dog clutches is switched from the first engagement to the second engagement is corrected by controlling said torque correcting device after said engagement is released from said first engagement and the revolution speed of said input shaft is controlled during changing from said first engagement to said second engagement.

5. An apparatus for controlling a vehicle as claimed in claim 1, wherein the torque variation of said output shaft taking place when said torque transmission path from said input shaft to said output shaft is switched from the transmission path formed into the transmission path formed by said second engagement is suppressed by controlling a torque of said input shaft with said torque correcting device around when said transmission path is switched.

6. An apparatus for controlling a vehicle as claimed in claim 1, wherein said torque correcting device has a function of controlling torque being transmitted by adjusting pressure force.

7. An apparatus for controlling a vehicle as claimed in claim 3, wherein a control signal of said friction clutch outputted from said apparatus for controlling a vehicle is a hydraulic command value.

8. An apparatus for controlling a vehicle as claimed in claim 6, wherein said torque correcting device controlling torque being transmitted by adjusting the pressure force is a wet type multi-plate friction clutch.

9. A method of controlling a vehicle in which torque is transmitted from an engine to an input shaft through a friction clutch and a gear type transmission is mounted, said gear type transmission includes a plurality of gears and a plurality of dog clutches that allow torque to be transmitted from said input shaft to an output shaft, a torque transmission path is formed from said input shaft to said output shaft by engaging said gears with said dog clutches, and the torque transmission path from said input shaft to said output shaft is formed by controlling a torque correcting device when the engagement of said gears with said dog clutches is switched from a first engagement to a second engagement, wherein said method comprises the step of making the engaging force of said friction clutch lower than that of said first engagement when said torque transmission path from said input shaft to said output shaft is switched from the transmission path formed by controlling said torque correcting device into the transmission path formed by said second engagement.

10. A method of controlling a vehicle in which torque is transmitted from an engine to an input shaft through a friction clutch and a gear type transmission is mounted, said gear type transmission having a plurality of gears and a plurality of dog clutches that allow torque to be transmitted from said input shaft to an output shaft, a torque transmission path is formed from said input shaft to said output shaft by engaging said gears with said dog clutches, and the torque transmission path from said input shaft to said output shaft is formed by controlling a torque correcting device when the engagement of said gears with said dog clutches is switched from a first engagement to a second engagement, wherein said method comprises the step of making the engaging force of said friction clutch lower than that of said first engagement before said transmission path is switched so as to suppress torque variation of said output shaft taking place when said torque transmission path from said input shaft to said output shaft is switched from the transmission path formed by controlling said torque correcting device into the transmission path formed by said second engagement.

11. A method of controlling a vehicle as claimed in claim 9, wherein after the engagement of said gears with said dog clutches is switched to the second engagement, the lowered engaging force of said friction clutch is made higher.

12. A method of controlling a vehicle as claimed in claim 9, further comprising the steps of correcting a torque lowered value of said output shaft taking place when the engagement of said gears with said dog clutches is switched from the first engagement to the second engagement by controlling said torque correcting device after the engagement is released at least from said first engagement and controlling a revolution speed of said input shaft when said first engagement is switched to said second engagement.

13. A method of controlling a vehicle as claimed in claim 9, further comprising the step of suppressing torque variation of said output shaft taking place when the torque transmission path from said input shaft to said output shaft is switched from the transmission path formed by said torque correcting device into the transmission path formed by said second engagement around when said transmission path is switched.

14. A method of controlling a vehicle as claimed in claim 9, wherein said torque correcting device is a device of controlling torque being transmitted by adjusting pressure force.

15. A method of controlling a vehicle as claimed in claim 11, wherein a control signal for controlling said friction clutch is a hydraulic command value.

16. A method of controlling a vehicle as claimed in claim 14, wherein said device of controlling the torque being transmitted by adjusting the pressure force is a wet type multi-plate friction clutch.

17. A transmission of a vehicle in which torque is transmitted from an engine to an input shaft through a friction clutch and having a gear type transmission provided with a plurality of gears and a plurality of dog clutches that allow torque to be transmitted from said input shaft to an output shaft, a torque transmission path is formed from said input shaft to said output shaft by engaging said gears with said dog clutches, and the torque transmission path from said input shaft to said output shaft is formed by controlling a torque correcting device when the engagement of said gears with said dog clutches is switched from a first engagement to a second engagement, wherein said transmission of a vehicle is arranged to control the engaging force of said friction clutch so as to make the engaging force of said friction clutch lower than that of said first engagement when said torque transmission path from said input shaft to said output shaft is switched from the transmission path formed by controlling said torque correcting device to the transmission path formed by said second engagement.

18. A transmission of a vehicle in which torque is transmitted from an engine to an input shaft through a friction clutch and having a gear drive transmission provided with a plurality of gears and a plurality of dog clutches that allow torque to be transmitted from said input shaft to an output shaft, a torque transmission path is formed from said input shaft to said output shaft by engaging said gears with said dog clutches, and the torque transmission path from said input shaft to said output shaft is formed by controlling a torque correcting device when the engagement of said gears with said dog clutches is switched from a first engagement to a second engagement, wherein said transmission of a vehicle is arranged to make the engaging force of said friction clutch lower than that of said first engagement before said transmission path is switched so as to suppress torque variation of said output shaft taking place when said torque transmission path from said input shaft to said output shaft is switched from the transmission path formed by controlling said torque correcting device to the transmission path formed by said second engagement.

19. A transmission of a vehicle as claimed in claim 17, wherein after the engagement of said gears with said dog clutches is switched to said second engagement, the lowered engaging force of said friction clutch is made higher.

20. A transmission of a vehicle as claimed in claim 17, wherein the torque lowered value of said output shaft taking place when the engagement of said gears with said dog clutches is switched from the first engagement to the second engagement is corrected after the engagement is released at least from said first engagement by controlling said torque correcting device, and the revolution speed of said input shaft is controlled when said first engagement is switched to said second engagement.

21. A transmission of a vehicle as claimed in claim 17, wherein the torque variation of said output shaft taking place when the torque transmission path from said input shaft to said output shaft is switched from the transmission path formed by said torque correcting device into the transmission path formed by said second engagement is suppressed by controlling a torque of the input shaft around when said transmission path is switched.

22. A transmission of a vehicle as claimed in claim 17, wherein said torque correcting device is a device for controlling torque being transmitted by adjusting pressure force.

23. A transmission of a vehicle as claimed in claim 19, wherein a control signal for controlling said friction clutch is a hydraulic command value.

24. A transmission of a vehicle as claimed in claim 22, wherein said device for controlling the torque being transmitted by adjusting the pressure force is a wet type multi-plate friction clutch.

25. An apparatus of controlling a vehicle in which torque is transmitted from an engine to an input shaft through a friction clutch and having a gear type transmission for forming a first torque transmission path from an input shaft to an output shaft at least after gear shifting and a torque correcting device for forming a second torque transmission path from said input shaft to said output shaft, said apparatus is arranged to execute gear shifting by switching the engagement of said gears with said dog clutches of said gear type transmission and to transmit torque to said output shaft through said second torque transmission path during switching said engagement by controlling said torque correcting device, wherein said apparatus is arranged to control the engaging force of said friction clutch so as to make the engaging force of said friction clutch lower than that before said engagement is switched when said torque transmission path is switched from said second torque transmission path to said first torque transmission path.

26. An apparatus of controlling a vehicle in which torque is transmitted from an engine to an input shaft through a friction clutch and having a gear type transmission for forming a first torque transmission path from said input shaft to an output shaft at least after gear shifting and a torque correcting device for forming a second torque transmission path from said input shaft to said output shaft, said apparatus is arranged to (execute gear shifting by switching the engagement of said gears with said dog clutches of said gear drive transmission, and torque being allowed to be transmitted to said output shaft through said second torque transmission path during switching said engagement by controlling said torque correcting device, wherein said apparatus is arranged to make the engaging force of said friction clutch lower than that of the previous engagement before switching said torque transmission path so as to suppress torque variation of said output shaft taking place when said torque transmission path is switched from said second torque transmission path to said first torque transmission path.

27. An apparatus of controlling a vehicle as claimed in claim 25, wherein after said engagement is switched, the lowered engaging force of said friction clutch is made higher.

28. An apparatus of controlling a vehicle as claimed in claim 25, wherein the torque of said input shaft is controlled around at the termination of switching said engagement so that the torque variation of said output shaft taking place when said torque transmission path is switched from said first torque transmission path to said second torque transmission path may be suppressed by controlling said torque correcting device.

29. An apparatus of controlling a vehicle as claimed in claim 25, wherein when torque is transmitted to said output shaft on said second torque transmission path, a torque lowered value of said output shaft taking place while said engagement is being switched is corrected by controlling said torque correcting device, and while said engagement is being switched, the revolution speed of said input shaft is controlled by controlling said torque correcting device.

30. An apparatus of controlling a vehicle as claimed in claim 25, wherein said torque correcting device is a wet type multi-plate friction clutch.

31. A method of controlling a vehicle in which torque is transmitted from an engine to an input shaft through a friction clutch and having a gear type transmission for forming a first torque transmission path from an input shaft to an output shaft at least after gear shifting and a torque correcting device for forming a second torque transmission path from said input shaft to said output shaft, the gear shifting is executed by switching the engagement of said gears with said dog clutches of said gear type transmission and transmitting torque to said output shaft on said second torque transmission path while said engagement is being switched by controlling said torque correcting device, wherein said method comprises the step of controlling the engaging force of said friction clutch so as to make the engaging force of said friction clutch lower than that of the previous engagement when said torque transmission path is switched from said second torque transmission path to said first torque transmission path.

32. A method of controlling a vehicle in which torque is transmitted from an engine to an input shaft through a friction clutch and having a gear type transmission for forming a first torque transmission path from said input shaft to an output shaft at least after gear shifting and a torque correcting device for forming a second torque transmission path from said input shaft to said output shaft, the gear shifting is executed by switching the engagement of said gears with said dog clutches of said gear type transmission and transmitting torque to said output shaft on said second torque transmission path while said engagement is being switched by controlled said torque correcting device, wherein said method comprises the step of making the engaging force of said friction clutch lower than that of the previous engagement before said torque transmission path is switched so as to suppress torque variation of said output shaft taking place when said torque transmission path is switched from said second torque transmission path to said first torque transmission path.

33. A method of controlling a vehicle as claimed in claim 31, wherein after said engagement is switched, the lowered engaging force of said friction clutch is made higher.

34. A method of controlling a vehicle as claimed in claim 31, wherein the torque of said input shaft is controlled around at the termination of switching said engagement so as to suppress torque variation of said output shaft taking place when said torque transmission path is switched from said first torque transmission path to said second torque transmission path.

35. A method of controlling a vehicle as claimed in claim 31, further comprising the steps of:

correcting the torque lowered value of said output shaft taking place when said engagement is being switched while torque is being transmitted to said output shaft on said second torque transmission path by controlling said torque correcting device, and controlling the revolution speed of said input shaft by controlling said torque correcting device while said engagement is being switched.

36. A method of controlling a vehicle as claimed in claim 31, wherein said torque correcting device is a wet type multiplate friction clutch.

37. A transmission of a vehicle in which torque is transmitted from an engine to an input shaft through a friction clutch and having a gear type transmission mechanism for forming a first torque transmission path from said input shaft to an output shaft at least after gear shifting and a torque correcting device for forming a second torque transmission path from said input shaft to said output shaft, said gear shifting is executed by switching the engagement of gears with dog clutches of said gear type transmission mechanism, and torque is transmitted to said output shaft on said second torque transmission path while said engagement is being switched by controlling said torque correcting device, wherein said transmission of a vehicle is arranged to control the engaging force of said friction clutch so as to make the engaging force of said friction clutch lower than that of the previous engagement when said torque transmission path is switched from said second torque transmission path to said first torque transmission path, and after said engagement is switched, the engaging force of said friction clutch is controlled so that the lowered engaging force of said friction clutch is made higher.

38. A transmission of a drive in which torque is transmitted from an engine to an input shaft through a friction clutch and having a gear type transmission mechanism for forming a first torque transmission path from said input shaft to an output shaft at least after gear shifting and a torque correcting device for forming a second torque transmission path from said input shaft to said output shaft, said gear shifting is executed by switching the engagement of gears with dog clutches of said gear type transmission mechanism, and torque is transmitted to said output shaft on said second torque transmission path while said engagement is being switched by controlling said torque correcting device, wherein said transmission of a vehicle is arranged to make the engaging force of said friction clutch lower than that of the previous engagement before the end of switching said torque transmission path so as to suppress the torque variation of said output shaft taking place when said torque transmission path is switched from said second torque transmission path into said first torque transmission path, and after said engagement is switched, the lowered engaging force of said friction clutch is made higher.

39. A transmission of a vehicle as claimed in claim 37, wherein the torque of said input shaft is controlled around at the termination of switching said engagement so that the torque variation of said output shaft taking place when said torque transmission path is switched from said first torque transmission path to said second torque transmission path by controlling said torque correcting device.

40. A transmission of a vehicle as claimed in claim 37, wherein while torque is being transmitted to said output shaft on said second torque transmission path, the torque lowered value of said output shaft taking place when said engagement is being switched is corrected by controlling said torque correcting device, and while said engagement is being switched, the revolution speed of said input shaft is controlled by controlling said torque correcting device.

* * * * *